US010565689B1

(12) United States Patent
Nallam

(10) Patent No.: US 10,565,689 B1
(45) Date of Patent: Feb. 18, 2020

(54) DYNAMIC RENDERING FOR FOVEATED RENDERING

(71) Applicant: QUALCOMM Incorporated, San Diego, CA (US)

(72) Inventor: Surendra Nallam, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/057,765

(22) Filed: Aug. 7, 2018

(51) Int. Cl.
*G06T 5/00* (2006.01)
*G06T 1/20* (2006.01)
*G09G 5/39* (2006.01)

(52) U.S. Cl.
CPC ............... *G06T 5/002* (2013.01); *G06T 1/20* (2013.01); *G09G 5/39* (2013.01); *G09G 2354/00* (2013.01); *G09G 2360/122* (2013.01); *G09G 2360/18* (2013.01)

(58) Field of Classification Search
CPC .. G06T 5/002; G06T 5/30; G06T 1/20; G06T 2354/00; G06T 2360/122; G06T 2360/18
USPC .......................................................... 345/614
See application file for complete search history.

(56) References Cited

U.S. PATENT DOCUMENTS

| 6,850,236 | B2 | 2/2005 | Deering |
| 8,963,931 | B2 | 2/2015 | Fowler |
| 9,727,991 | B2 | 8/2017 | Guenter et al. |
| 2001/0055025 | A1* | 12/2001 | Deering ............ G06T 5/20 345/611 |
| 2008/0055286 | A1 | 3/2008 | Garg et al. |
| 2016/0350965 | A1 | 12/2016 | Lum et al. |
| 2017/0200308 | A1 | 7/2017 | Nguyen et al. |
| 2017/0287446 | A1 | 10/2017 | Young et al. |
| 2018/0033168 | A1 | 2/2018 | Beri et al. |
| 2018/0144538 | A1 | 5/2018 | Jeong et al. |
| 2019/0045222 | A1 | 2/2019 | Yip et al. |

* cited by examiner

*Primary Examiner* — King Y Poon
*Assistant Examiner* — Vincent Peren
(74) *Attorney, Agent, or Firm* — Arent Fox LLP

(57) ABSTRACT

A method, an apparatus, and a computer-readable medium for wireless communication are provided. In one aspect, an example method may include receiving information indicative of an eye gaze region. The method may include improving a graphics processing pipeline by based on the information indicative of the eye gaze region.

30 Claims, 15 Drawing Sheets

REPRESENTS FRAMEBUFFER

REPRESENTS BIN

REPRESENTS EYE GAZE REGION

REPRESENTS FRAMEBUFFER

REPRESENTS BIN

REPRESENTS EYE GAZE REGION

REPRESENTS FRAMEBUFFER

REPRESENTS BIN

REPRESENTS EYE GAZE REGION

REPRESENTS FRAMEBUFFER

REPRESENTS BIN

REPRESENTS EYE GAZE REGION

REPRESENTS FRAMEBUFFER

REPRESENTS BIN

REPRESENTS EYE GAZE REGION

DYNAMIC RENDERING FOR FOVEATED RENDERING

FIELD

The present disclosure relates generally relates to graphics processing.

BACKGROUND

Computing devices often utilize a graphics processing unit (GPU) to accelerate the rendering of graphical data for display. Such computing devices may include, for example, computer workstations, mobile phones such as so-called smartphones, embedded systems, personal computers, tablet computers, and video game consoles. GPUs execute a graphics processing pipeline that includes a plurality of processing stages that operate together to execute graphics processing commands/instructions and output a frame. A central processing unit (CPU) may control the operation of the GPU by issuing one or more graphics processing commands/instructions to the GPU. Modern day CPUs are typically capable of concurrently executing multiple applications, each of which may need to utilize the GPU during execution. A device that provides content for visual presentation on a display generally includes a graphics processing unit (GPU).

A GPU renders a frame of graphical content into a framebuffer for display. This rendered frame may be read from the framebuffer and processed by a display processing unit prior to being displayed. For example, the display processing unit may be configured to perform processing on one or more frames that were rendered for display by the GPU and subsequently output the processed frame to a display. The pipeline that includes the CPU, GPU, and display processing unit may be referred to as a display processing pipeline.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be configured to receive information indicative of an eye gaze region. The apparatus may be configured to divide a framebuffer into a plurality of bins. The apparatus may be configured to determine, based on the information indicative of the eye gaze region, that first graphical content for a first group of one or more bins of the plurality of bins is to be rendered using a tile-based rendering mode. The apparatus may be configured to determine, based on the information indicative of the eye gaze region, that second graphical content for a second group of one or more bins of the plurality of bins is to be rendered using a direct rendering mode. The apparatus may be configured to render the first graphical content for the first group of one or more bins into a first memory. The apparatus may be configured to render the second graphical content for the second group of one or more bins into a second memory.

In an aspect of the disclosure, a method, a computer-readable medium, and an apparatus are provided. The apparatus may be configured to receive information indicative of an eye gaze region. The apparatus may be configured to select, based on the information indicative of the eye gaze region, a bin layout from a plurality of bin layouts. The apparatus may be configured to divide, based on the selected bin layout, a framebuffer into a plurality of bins. The apparatus may be configured to render graphical content for the framebuffer using the plurality of bins.

In an aspect of the disclosure, a method, a computer-readable medium, and an apparatus are provided. The apparatus may be configured to receive information indicative of an eye gaze region. The apparatus may be configured to generate, based on the eye gaze region, a sample count buffer. The sample count buffer may include a respective sample count for each respective pixel of a plurality of pixels of a framebuffer. The respective sample count for each respective pixel may indicate a respective number of samples required to fragment shade the respective pixel. The apparatus may be configured to generate an intermediate buffer for spatial anti-alias rendering. The intermediate buffer may be configured to store a first plurality of samples at a first sample count per pixel and the framebuffer is configured to store a second plurality of samples at a second sample count per pixel. The first plurality of samples may be greater than the second plurality of samples. The first sample count per pixel may be higher than the second sample count per pixel. The apparatus may be configured to render, into the intermediate buffer, each respective pixel of the plurality of pixels at the first sample count to generate the first plurality of samples. The apparatus may be configured to control, based on the respective sample count in the sample count buffer for each respective pixel, how many samples of the generated first plurality of samples for each respective pixel of the plurality of pixels are to be used for fragment shading.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1A:
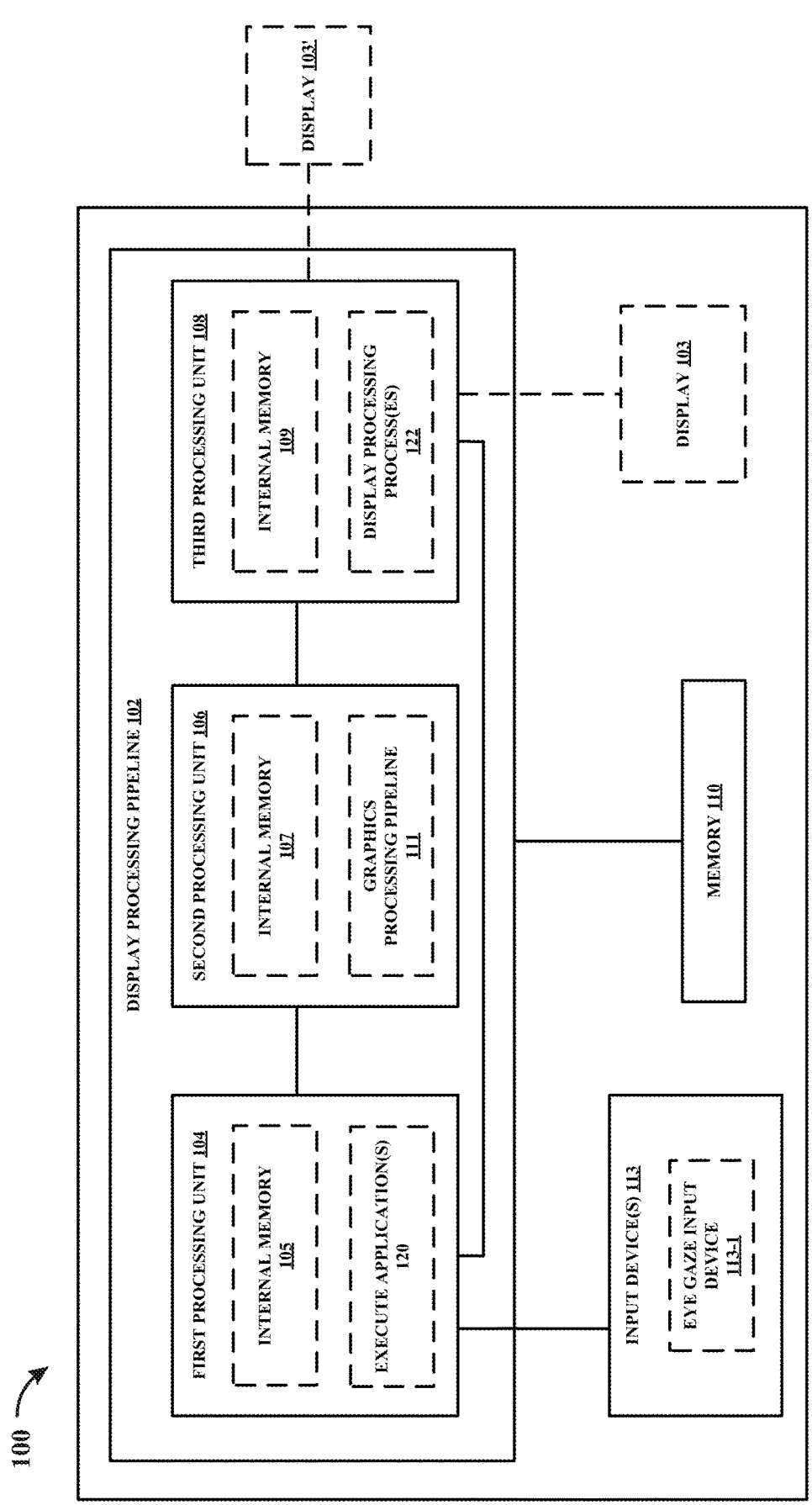
FIG. 1A is a block diagram that illustrates an example content generation and coding system in accordance with the techniques of this disclosure.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems on a chip (SoC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application (i.e., software) being configured to perform one or more functions. In such examples, it is understood that the application may be stored on a memory (e.g., on-chip memory of a processor, system memory, or any other memory). Hardware described herein, such as a processor may be configured to execute the application. For example, the application may be described as including code that, when executed by the hardware, causes the hardware to perform one or more techniques described herein. As an example, the hardware may access the code from a memory and executed the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, instances of the term "content" may refer to graphical content or display content. In some examples, as used herein, the term "graphical content" may refer to a content generated by a processing unit configured to perform graphics processing. For example, the term "graphical content" may refer to content generated by one or more processes of a graphics processing pipeline. In some examples, as used herein, the term "graphical content" may refer to content generated by a graphics processing unit. In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling (e.g., upscaling or downscaling) on a frame. In some examples, a frame may refer to a layer. In other examples, a frame may refer to two or more layers that have already been blended together to form the frame (i.e., the frame includes two or more layers, and the frame that includes two or more layers may subsequently be blended).

As referenced herein, a first component (e.g., a GPU) may provide content, such as a frame, to a second component (e.g., a display processing unit). In some examples, the first component may provide content to the second component by storing the content in a memory accessible to the second component. In such examples, the second component may be configured to read the content stored in the memory by the first component. In other examples, the first component may provide content to the second component without any intermediary components (e.g., without memory or another component). In such examples, the first component may be described as providing content directly to the second component. For example, the first component may output the content to the second component, and the second component may be configured to store the content received from the first component in a memory, such as a buffer.

FIG. 1A is a block diagram that illustrates an example device 100 configured to perform one or more techniques of this disclosure. The device 100 includes display processing pipeline 102 configured to perform one or more technique of this disclosure. In accordance with the techniques described herein, the display processing pipeline 102 may be configured to generate content destined for display. The display processing pipeline 102 may be communicatively coupled to a display 103. In the example of FIG. 1A, the display 103 is a display of the device 100. However, in other examples, the display 103 may be a display external to the device 100 (as shown in FIG. 1 with display 103'). Reference to display 103 may refer to display 103 or display 103' (i.e., a display of the device or a display external to the device).

In examples where the display 103 is not external to the device 100, the a component of the device may be configured to transmit or otherwise provide commands and/or content to the display 103 for presentment thereon. In examples where the display 103 is external to the device 100, the device 100 may be configured to transmit or otherwise provide commands and/or content to the display 103 for presentment thereon. As used herein, "commands," "instructions," and "code" may be used interchangeably. In some examples, the display 103 of the device 100 may represent a display projector configured to project content, such as onto a viewing medium (e.g., a screen, a wall, or any other viewing medium). In some examples, the display 103 may include one or more of: a liquid crystal display (LCD), a plasma display, an organic light emitting diode (OLED) display, a projection display device, an augmented reality (AR) display device, a virtual reality (VR) display device, a head-mounted display, a wearable display, or any other type of display.

In some examples, the display 103 represents a first display and a second display, where the first display is for presenting display content for a left eye of a user and the second display is for presenting display content for a right eye of a user. In such examples, the first display and the second display may be respectively referred to as a left eye display and a right eye display. In some examples, the display 103 may be a video mode display. In other examples, the display 103 may be a command mode display.

The display processing pipeline 102 may include one or more components (or circuits) configured to perform one or more techniques of this disclosure. As used herein, reference to the display processing pipeline being configured to perform any function, technique, or the like refers to one or more components of the display processing pipeline being configured to form such function, technique, or the like.

In the example of FIG. 1A, the display processing pipeline 102 includes a first processing unit 104, a second processing unit 106, and a third processing unit 108. In some examples, the first processing unit 104 may be configured to execute one or more applications 120, the second processing unit 106 may be configured to perform graphics processing, and the third processing unit 108 may be configured to perform display processing. In such examples, the first processing unit 104 may be a central processing unit (CPU), the second processing unit 106 may be a graphics processing unit (GPU) or a general purpose GPU (GPGPU), and the third processing unit 108 may be a display processing unit, which may also be referred to as a display processor. In other examples, the first processing unit 104, the second processing unit 106, and the third processing unit 108 may each be any processing unit configured to perform one or more feature described with respect to each processing unit.

The first processing unit may include an internal memory 105. The second processing unit 106 may include an internal memory 107. In some examples, the internal memory 107 may be referred to as a GMEM. The third processing unit 108 may include an internal memory 109. One or more of the processing units 104, 106, and 108 of the display processing pipeline 102 may be communicatively coupled to a memory 110. The memory 110 may be external to the one or more of the processing units 104, 106, and 108 of the display processing pipeline 102. For example, the memory 110 may be a system memory. The system memory may be a system memory of the device 100 that is accessible by one or more components of the device 100. For example, the first processing unit 104 may be configured to read from and/or write to the memory 110. The second processing unit 106 may be configured to read from and/or write to the memory 110. The third processing unit 108 may be configured to read from and/or write to the memory 110. The first processing unit 104, the second processing unit 106, and the third processing unit 108 may be communicatively coupled to the memory 110 over a bus. In some examples, the one or more components of the display processing pipeline 102 may be communicatively coupled to each other over the bus or a different connection. In other examples, the system memory may be a memory external to the device 100.

The internal memory 105, the internal memory 107, the internal memory 109, and/or the memory 110 may include one or more volatile or non-volatile memories or storage devices. In some examples, the internal memory 105, the internal memory 107, the internal memory 109, and/or the memory 110 may include random access memory (RAM), static RAM (SRAM), dynamic RAM (DRAM), erasable programmable ROM (EPROM), electrically erasable programmable ROM (EEPROM), Flash memory, a magnetic data media or an optical storage media, or any other type of memory.

The internal memory 105, the internal memory 107, the internal memory 109, and/or the memory 110 may be a non-transitory storage medium according to some examples. The term "non-transitory" may indicate that the storage medium is not embodied in a carrier wave or a propagated signal. However, the term "non-transitory" should not be interpreted to mean that the internal memory 105, the internal memory 107, the internal memory 109, and/or the memory 110 is non-movable or that its contents are static. As one example, the memory 110 may be removed from the device 100 and moved to another device. As another example, the memory 110 may not be removable from the device 100.

In some examples, the first processing unit 104 may be configured to perform any technique described herein with respect to the second processing unit 106. In such examples, the display processing pipeline 102 may only include the first processing unit 104 and the third processing unit 108. Alternatively, the display processing pipeline 102 may still include the second processing unit 106, but one or more of the techniques described herein with respect to the second processing unit 106 may instead be performed by the first processing unit 104.

In some examples, the first processing unit 104 may be configured to perform any technique described herein with respect to the third processing unit 108. In such examples, the display processing pipeline 102 may only include the first processing unit 104 and the second processing unit 106. Alternatively, the display processing pipeline 102 may still include the third processing unit 108, but one or more of the techniques described herein with respect to the third processing unit 108 may instead be performed by the first processing unit 104.

In some examples, the second processing unit 106 may be configured to perform any technique described herein with respect to the third processing unit 108. In such examples, the display processing pipeline 102 may only include the first processing unit 104 and the second processing unit 106. Alternatively, the display processing pipeline 102 may still include the third processing unit 108, but one or more of the techniques described herein with respect to the third processing unit 108 may instead be performed by the second processing unit 106.

The first processing unit 104 may be configured to execute one or more applications 120. The first processing unit 104 may be configured to provide one or more commands/instructions (e.g., draw instructions) to the second processing unit 106 to cause the second processing unit 106 to generate graphical content. As used herein, "commands," "instructions," and "code" may be used interchangeably. For example, execution of an application of the one or more applications 120 may cause one or more commands/instructions (e.g., draw instructions) corresponding to the application to be provided to the second processing unit 106 to generate graphical content for the application. In some examples, an application may be software (e.g., code) stored in the internal memory 105. In other examples, an application may be software stored in the memory 110 or another memory accessible to the first processing unit 104. In other examples, an application may be software stored in a plurality of memories, such as the internal memory 105 and the memory 110.

The second processing unit 106 may be configured to perform graphics processing in accordance with the techniques described herein, such as in a graphics processing pipeline 111. Otherwise described, the second processing unit 106 may be configured to perform any process described herein with respect to the second processing unit 106. For example, the second processing unit 106 may be configured to generate graphical content using tile-based rendering (also referring to as "binning"), direct rendering, adaptive rendering, foveated rendering, spatial anti-alias rendering, and/or any graphics processing technique.

In tile-based rendering, the second processing unit 106 may be configured to divide a buffer (e.g., a framebuffer) into a plurality of sub-regions referred to as bins or tile. For example, if the internal memory 107 is able to store N memory units of data (where N is a positive integer), then a scene may be divided into bins such that the pixel data contained in each bins is less than or equal to N memory units. In this way, the second processing unit 106 may render the scene by dividing the scene into bins that can be individually rendered into the internal memory 107, store each rendered bin from internal memory 107 to a framebuffer (which may be located in the memory 110), and repeat the rendering and storing for each bin of the scene. It is understood that a rendered frame is the combination of all the rendered bins. Rendering a bin into the internal memory 107 may include executing commands to render the primitives in the associated bin into the internal memory 107. The buffer that stores the rendered frame (i.e., all rendered bins corresponding to the frame) is referred to as the framebuffer. The framebuffer is allocated memory that holds one or more rendered frames that can be read by one or more other components, such as the third processing unit 108. Therefore, reference to dividing a framebuffer into a plurality of sub-regions refers to configuring the second processing unit 106 to render graphical content corresponding to a frame on a bin-by-bin basis.

As described herein, the bins defined during the binning pass may be synonyms for bins/tiles of a rendered frame (which may be referred to as the rendered scene). For example, each bin may represent a portion of the rendered frame. The bins making up a scene can each be associated with a bin in memory that stores the graphical content included in each respective bin. A bin may be a portion of a memory that stores a portion of a rendered frame.

Tile-based rendering generally includes two passes: a binning pass and a rendering pass. During the binning pass, the second processing unit 106 may be configured to receive and process draw commands for a particular scene in preparation for rendering the scene into a frame. A draw command may include one or more primitives. A primitive may have one or more vertices. The second processing unit 106 may be configured to generate position data (e.g., coordinate data, such as three-axis (X, Y, Z) coordinate data) in screen space for each vertex of each primitive in the draw commands for a particular scene. During the binning pass, the second processing unit 106 may be configured to divide a buffer into which a frame is to be rendered into a plurality bins. In some examples, the second processing unit 106 may be configured to generate visibility information for each bin of the plurality of bins during the binning pass. In this regard, it is understood that the second processing unit 106 may be configured to generate visibility information on a per bin basis (e.g., visibility information is generated for each bin).

After generating visibility information for each bin (e.g., during the binning pass), the second processing unit 106 may be configured to separately render each respective bin of the plurality of bins using the respective visibility information for each respective bin. In some examples, the second processing unit 106 may be configured to use the visibility stream generated during the binning pass to refrain from rendering primitives identified as invisible during the binning pass, which avoids overdraw. Accordingly, only the visible primitives and/or the possibly visible primitives are rendered into each bin.

During the rendering of each bin, the second processing unit 106 may be configured to store the pixel values corresponding to the bin being rendered in the internal memory 107. In this way, tile-based rendering uses the internal memory 107 of the second processing unit 106. The second processing unit 106 may be configured to store (e.g., copy) a rendered bin stored in the internal memory 107 to a memory external to the second processing unit 106, such as memory 110. In some examples, once a bin is fully rendered into the internal memory 107, the second processing unit 106 may be configured to store the fully rendered bin to a memory external to the second processing unit 106. In other examples, the second processing unit 106 may be configured to render graphical content for a bin into the internal memory 107 and store graphical content rendered into the internal memory 107 into a memory external to the second processing unit 106 in parallel. Accordingly, while the second processing unit 106 can render graphical content on a bin-by-bin basis, graphical content rendered on a bin-by-bin basis into the internal memory 107 may be subsequently stored in the framebuffer (e.g., allocated in the memory 110).

As used herein, "visibility information" may, in some examples, refer to any information in any data structure that indicates whether one or more primitives is visible and/or may be visible (e.g., possibly visible) with respect to the bin for which the visibility information was generated. Whether a primitive is visible/possibly visible or not visible may, as described herein, respectively refer to whether the primitive will be rendered or not rendered with respect to the bin for which the visibility information was generated. As used herein, a primitive that "may be visible" (e.g., a possibly visible primitive) may refer to the fact that it is unknown whether the primitive will be visible or will not be visible in the rendered frame (i.e., in the respective rendered bin of the rendered frame) at a particular processing point in the graphics processing pipeline (e.g., during the binning pass before the rendering pass) according to one examples. In another example, a primitive that "may be visible" (e.g., a possibly visible primitive) may refer to a primitive that is not or will not be definitively visible in the rendered frame (i.e., in the respective rendered bin of the rendered frame) at a particular processing point in the graphics processing pipeline (e.g., during the binning pass before the rendering pass).

For example, "visibility information" may refer to any information in any data structure that indicates whether one or more primitives associated with one or more draw commands is visible and/or may be visible with respect to the bin. As another example, "visibility information" may be described as a visibility stream that includes a sequence of 1's and 0's with each "1" or "0" being associated with a particular primitive located within the bin. In some examples, each "1" may indicate that the primitive respectively associated therewith is or may be visible in the rendered frame (i.e., in the respective rendered bin of the rendered frame), and each "0" may indicate that the primitive respectively associated therewith will not be visible in the rendered frame (i.e., in the respective rendered bin of the rendered frame). In other examples, each "0" may indicate that the primitive respectively associated therewith is or may be visible in the rendered frame (i.e., in respective the rendered bin of the rendered frame), and each "1" may indicate that the primitive respectively associated therewith will not be visible in the rendered frame (i.e., in the respective rendered bin of the rendered frame). In other examples, "visibility information" may refer to a data structure comprising visibility information in a format different from a visibility stream.

In direct rendering, the second processing unit 106 may be configured to render directly to the framebuffer (e.g., a memory location in memory 110) in one pass. Otherwise described, the second processing unit 106 may be configured to render graphical content to the framebuffer without using the internal memory 107 for intermediate storage of rendered graphical content. In some examples, direct rendering mode may be considered as a single bin in accordance with how tile-based rendering is performed, except that the entire framebuffer is treated as a single bin. As referred to herein, a rendering mode (e.g., a direct rendering mode, a tile-based rendering mode, an adaptive rendering mode, a foveated rendering mode, and a spatial anti-alias rendering mode) may refer to the second processing unit 106 being configured to perform one or more techniques associated with the rendering mode. In some examples, spatial anti-alias rendering may also be referred to as spatial anti-alias rasterization.

In adaptive rendering, the second processing unit 106 may be configured to combine one or more techniques of tile-based rendering and one or more techniques of direct rendering. For example, in adaptive rendering, one or more bins may be rendered to the internal memory 107 and subsequently stored from the internal memory 107 to the framebuffer in a memory external to the second processing unit 106 (e.g., the bins that are rendered using tile-based rendering mode), and one or more bins may be rendered directly to the framebuffer in the memory external to the second processing unit 106 (e.g., the bins that are rendered using direct rendering mode). The second processing unit 106 may be configured to render bins that are to be rendered using direct rendering using the visibility information generated during the binning pass for these respective bins and the rendering of these direct rendered bins may occur in one rendering pass. Conversely, the second processing unit 106 may be configured to render bins that are to be rendered using tile-based rendering using the visibility information generated during the binning pass for these respective bins and the rendering of these tile-based rendered bins may occur in multiple rendering passes (e.g., a respective rendering pass for each respective bin of the bins that are rendered using tile-based rendering).

In foveated rendering, the second processing unit 106 may be configured to render graphical content of a frame based on information indicative of an eye gaze region. The human vision system results in high resolution vision in the fovea (the central vision area, which is where a person is looking) and low resolution in the peripheral region around the fovea. Foveated rendering leverages how the human vision system works by rendering graphical content corresponding to an eye gaze region at a high resolution, and rendering graphical content corresponding the peripheral region around the eye gaze region at a low resolution. By reducing the resolution in the peripheral region, the computational load of the second processing unit 106 may be reduced, thus resulting in more efficient processing.

In spatial anti-alias rendering, rendering for a particular pixel may be upsampled and the subsequently rendered upsampled graphical content may be downsampled to generate a rendered frame with improved quality relative to the quality of the frame had spatial anti-alias rendering not been used. Two examples of spatial anti-alias rendering include Multi-Sample Anti-Alias (MSAA) rendering and Supersampling Anti-Alias rendering. Otherwise described, spatial anti-alias rendering is a technique to obtain higher quality rendering (e.g., higher resolution rendering) in which multiple samples of a pixel is generated and used during rendering (e.g., during rasterization). There can be different sample levels. For example, a sample level may be N sample levels, where N may be greater than or equal to one. As an example, a sample level of 2 refers to two samples per pixel being generated and used during rendering. As another example, a sample level of 4 refers to four samples per pixel being generated and used during rendering. As another example, 1×MSAA (e.g., a sample level of one for MSAA) may be a special case where the number of samples per pixel is equal to one (i.e., meaning that there is no upsampling). In spatial anti-alias rendering, the memory to which graphical content is being rendered is accessed for each sample. Therefore, as the sample level goes up, so too does the memory access overhead for rendering the graphical content using spatial anti-alias rendering.

In some examples, rendering graphical content to a framebuffer may refer to writing pixel values to the framebuffer. A pixel value may have one or more components, such as one or more color components. Each component may have a corresponding value. For example, a pixel in the red, green, and blue color space may have a red color component value, a green color component value, and a blue color component value.

In accordance with the techniques described herein, the second processing unit 106 may be configured to more efficiently generate graphical content for foveated rendering. The second processing unit 106 may be configured to more efficiently perform adaptive rendering for foveated rendering. For example, the second processing unit 106 may be configured to receive information indicative of the eye gaze region. Based on the information indicative of the eye gaze region, the second processing unit 106 may be configured to determine which bin(s) of a plurality of bins corresponding to a framebuffer are to be rendered using a tile-based rendering mode and determine which bin(s) of the plurality of bins corresponding to the framebuffer are to be rendered using a direct rendering mode. In such examples, the second processing unit 106 may be configured to more efficiently generate graphical content, such as by enabling faster memory access for select graphical content and reduce memory access overhead for select graphical content in accordance with the techniques described herein.

For example, in accordance with the techniques described herein, the second processing unit 106 may be configured to render first graphical content for a first group of one or more bins on a per bin basis directly into the internal memory 107, and render second graphical content for a second group of one or more bins directly into a framebuffer in memory 110. In such an example, the first graphical content rendered directly into the internal memory 107 may be subsequently stored in the framebuffer. In such an example, the second processing unit 106 may be described as being configured to render the first graphical content for the first group of one or more bins using tile-based rendering, and render the second graphical content for the second group of one or more bins using direct rendering. The first graphical content and the second graphical content are part of the same frame. The first group of one or more bins may correspond to or otherwise by associated with an eye gaze region, and the second group of one or more bins may correspond to or otherwise be associated with a peripheral region outside of the eye gaze region.

The first group of one or more bins may be rendered by the second processing unit 106 using spatial anti-alias rendering of a first sample level, and the second group of one or more bins may be rendered by the second processing unit 106 using spatial anti-alias rendering of a second sample level. The first sample level is greater than the second sample level. The first sample level may be two or more samples per pixel and the second sample level may be one or more samples per pixel, such that the first sample level is greater than the second sample level.

By rendering the first graphical content to be rendered at the first sample level into the internal memory 107 and the second graphical content to be rendered at the second sample level directly into the framebuffer in memory 110, multiple memory access is faster for higher sample level spatial anti-alias rendering and internal to framebuffer store overhead is reduced for lower sample level spatial anti-alias rendering. Otherwise, if an entire frame was rendered using tile-based rendering, this would be efficient for the first group of one or more bins but inefficient for the second group of one or more bins. Similarly, if an entire frame was rendered using direct rendering, this would be efficient for the second group of one or more bins but inefficient for the first group of one or more bins.

Figure 6A:
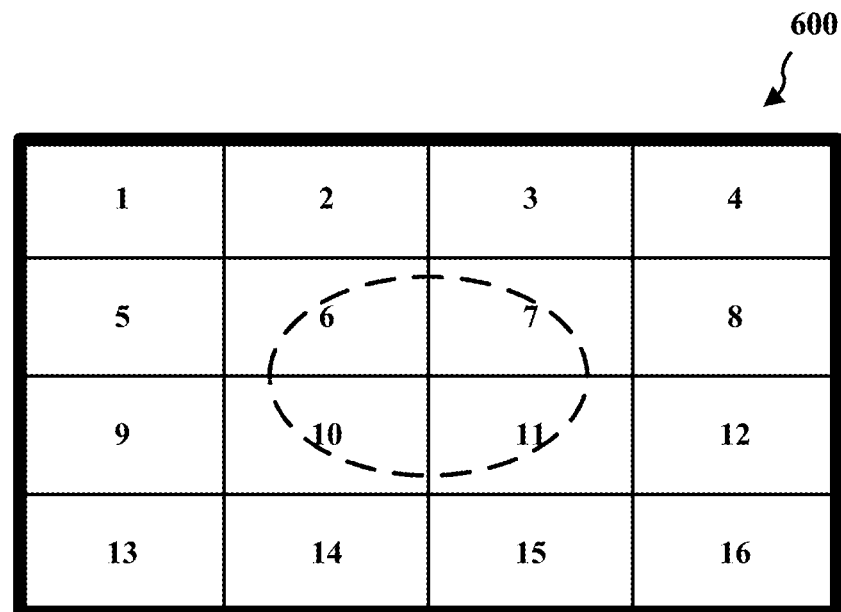
FIG. 6A illustrates an example framebuffer with an eye gaze region overlapping a plurality of bins.
Figure 6A:
Figure 6A:
Figure 6A:
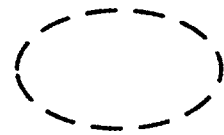

As an example, FIG. 6A illustrates an example framebuffer 600 with an eye gaze region overlapping a plurality of bins. In the example of FIG. 6A, the framebuffer 600 is divided into 16 bins and bins 6, 7, 10, and 11 overlap with the eye gaze region. Based on information indicative of the eye gaze region, the second processing unit 106 may be configured to determine which bin(s) of bins 1-16 are to be rendered using a tile-based rendering mode and determine which bin(s) of bins 1-16 are to be rendered using a direct rendering mode. Otherwise described, the second processing unit 106 may be configured to determine which bin(s) of bins 1-16 are to be rendered into the internal memory 107 and determine which bin(s) of bins 1-16 are to be rendered directly into the framebuffer in memory 110. In the example of FIG. 6A, the second processing unit 106 may be configured to determine that bins 6, 7, 10, and 11 are to be rendered using a tile-based rendering mode and determine that bins 1-5, 8, 9, and 12-16 are to be rendered using a direct rendering mode. Otherwise described, the second processing unit 106 may be configured to determine that bins 6, 7, 10, and 11 are to be rendered into the internal memory 107 and determine that bins 1-5, 8, 9, and 12-16 are to be rendered directly into the framebuffer in memory 110. In some examples, the second processing unit 106 may be configured to render bins 6, 7, 10, and 11 using spatial anti-alias rendering of a first sample level and render bins 1-5, 8, 9, and 12-16 using spatial anti-alias rendering of a second sample level. In such examples, the second processing unit 106 is configured to more efficiently generate graphical content, such as by enabling faster memory access for select graphical content and internal to framebuffer store overhead is reduced for select graphical content in accordance with the techniques described herein.

In the example of FIG. 6A, the second processing unit 106 may be configured to generate visibility information for each bin of bins 1-16, such as during a binning pass. The second processing unit 106 may be configured to render each bin of bins 6, 7, 10, and 11 on a per bin basis based on the respective visibility information for each respective bin. For example, the second processing unit 106 may be configured to render bin 6 using visibility information generated for bin 6 in a first rendering pass, render bin 7 using visibility information generated for bin 7 in a second rendering pass, render bin 10 using visibility information generated for bin 10 in a third rendering pass, and render bin 11 using visibility information generated for bin 11 in a fourth rendering pass. The number of the rendering passes in this example does not imply the order in which these separate rendering occur. Rather, the numbering of the rendering passes connotes that each rendering pass is separate and distinct from the other rendering passes.

In some examples, for each of bins 6, 7, 10, and 11, the second processing unit 106 may be configured to set a respective scissor and respective bin dimensions on a per bin basis. The respective scissor and bin dimensions for each bin may be specified by one or more instructions received from the first processing unit 104. The first processing unit 104 may be configured to provide the one or more instructions that indicate scissor and bin dimensions information based on execution of an application for which graphical content is being generated. Otherwise described, an application running on the first processing unit 104 may control the indication of scissor and bin dimensions information in some examples.

The second processing unit 106 may be configured render each of bins 6, 7, 10, and 11 into the internal memory 107. As described herein, reference to rendering a bin refers to rendering graphical content corresponding to the bin, and vice versa. In examples described herein where a bin is rendered into the internal memory 107 (e.g., bins 6, 7, 10, and 11), the internal memory 107 may be referred to as an intermediate buffer, an intermediate framebuffer, a bin buffer, or the like because the rendered bin will be subsequently stored in the framebuffer in memory 110.

In some examples, the second processing unit 106 may be configured to render each bin of bins 1-5, 8, 9, and 12-16 on a per bin basis based on the respective visibility information for each respective bin (e.g., onto memory 110 using direct rendering). For example, the second processing unit 106 may be configured to render bin 1 using visibility information generated for bin 1 in a first rendering pass, render bin 2 using visibility information generated for bin 2 in a second rendering pass, render bin 3 using visibility information generated for bin 3 in a third rendering pass, render bin 4 using visibility information generated for bin 4 in a fourth rendering pass, render bin 5 using visibility information generated for bin 5 in a fifth rendering pass, render bin 8 using visibility information generated for bin 8 in a sixth rendering pass, render bin 9 using visibility information generated for bin 9 in a seventh rendering pass, render bin 12 using visibility information generated for bin 12 in a eighth rendering pass, render bin 13 using visibility information generated for bin 13 in a ninth rendering pass, render bin 14 using visibility information generated for bin 14 in a tenth rendering pass, render bin 15 using visibility information generated for bin 15 in a eleventh rendering pass, and render bin 16 using visibility information generated for bin 16 in a twelfth rendering pass. The number of the rendering passes in this example does not imply the order in which these separate rendering occur. Rather, the numbering of the rendering passes connotes that each rendering pass is separate and distinct from the other rendering passes.

In such examples, bins 1-5, 8, 9, and 12-16, the second processing unit 106 may be configured to set a respective scissor and respective bin dimensions. The respective scissor and bin dimensions for each bin may be specified by one or more instructions received from the first processing unit 104. The first processing unit 104 may be configured to provide the one or more instructions that indicate scissor and bin dimensions information based on execution of an application for which graphical content is being generated. Otherwise described, an application running on the first processing unit 104 may control the indication of scissor and bin dimensions information in some examples.

In other examples, the second processing unit 106 may be configured to render bins 1-5, 8, 9, and 12-16 in a single rendering pass (e.g., onto memory 110 using direct rendering). To render the bins 1-5, 8, 9, and 12-16 in a single rendering pass, the second processing unit 106 may be configured to combine the respective visibility information for each respective bin of bins 1-5, 8, 9, and 12-16. The second processing unit 106 may be configured to set multiple respective scissors and respective bin dimensions. The respective scissors and bin dimensions for bins 1-5, 8, 9, and 12-16 may be specified by one or more instructions received from the first processing unit 104. The first processing unit 104 may be configured to provide the one or more instructions that indicate scissor and bin dimensions information based on execution of an application for which graphical content is being generated. Otherwise described, an application running on the first processing unit 104 may control the indication of scissor and bin dimensions information in some examples. The second processing unit 106 may be configured to render bins 1-5, 8, 9, and 12-16 based on the combined visibility information.

In accordance with the techniques described herein, the second processing unit 106 may be configured to more efficiently generate graphical content for foveated rendering. For example, the second processing unit 106 may be configured to more efficiently divide a framebuffer into a plurality of bins based on information indicative of an eye gaze region. The second processing unit 106 may be configured to receive information indicative of the eye gaze region. Based on the information indicative of the eye gaze region, the second processing unit 106 may be configured select a bin layout from a plurality of bin layouts. The plurality of bin layouts may include two or more bin layouts. In some examples, the bin size in each bin layout of the plurality of bin layouts may be the same. In other examples, the bin size may not be the same in the plurality of bin layouts. In some examples, the plurality of bin layouts includes a standard bin layout. One or more other bit layouts of the plurality of bin layouts may be a vertically and/or horizontally shifted bin layout relative to the standard bin layout. For example, a bin layout may be vertically and/or horizontally shifted relative to the framebuffer and when compared to the standard bin layout.

Figure 6B:
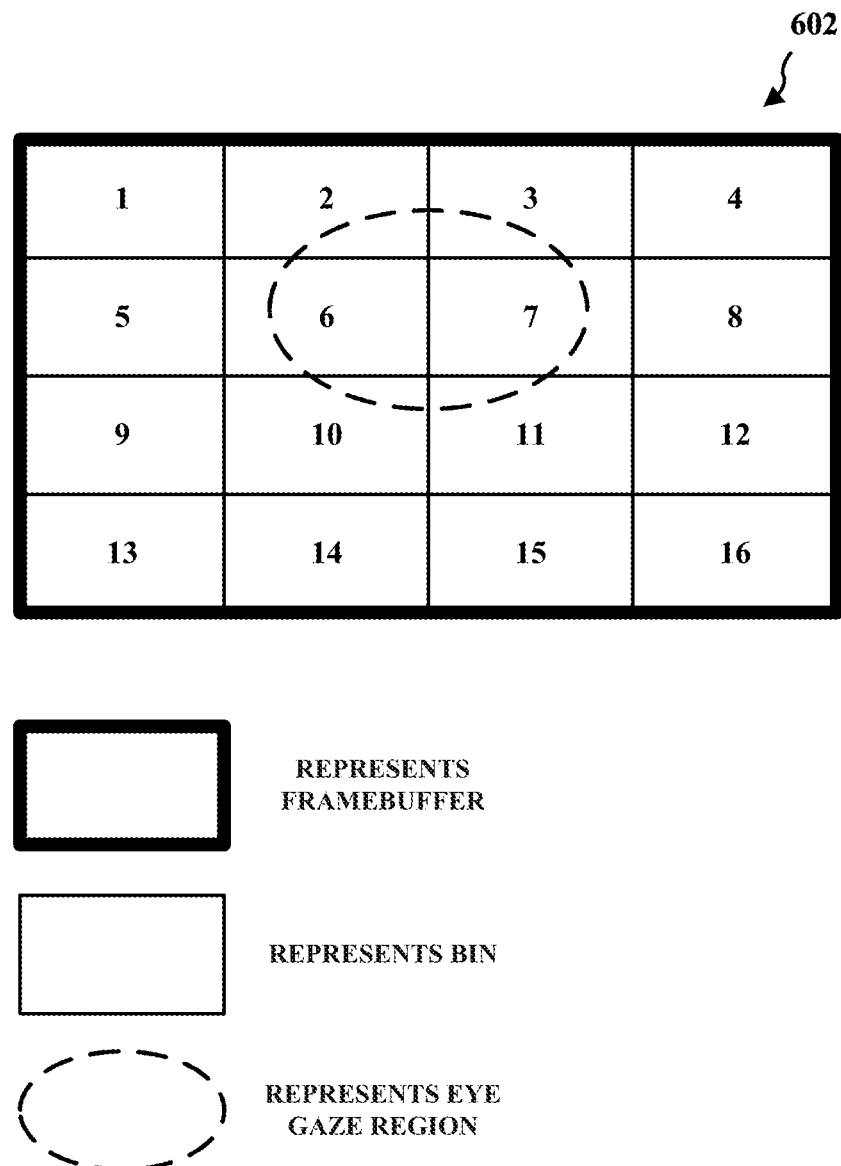
FIGS. 6B-G illustrate example bin layouts.
Figure 6C:
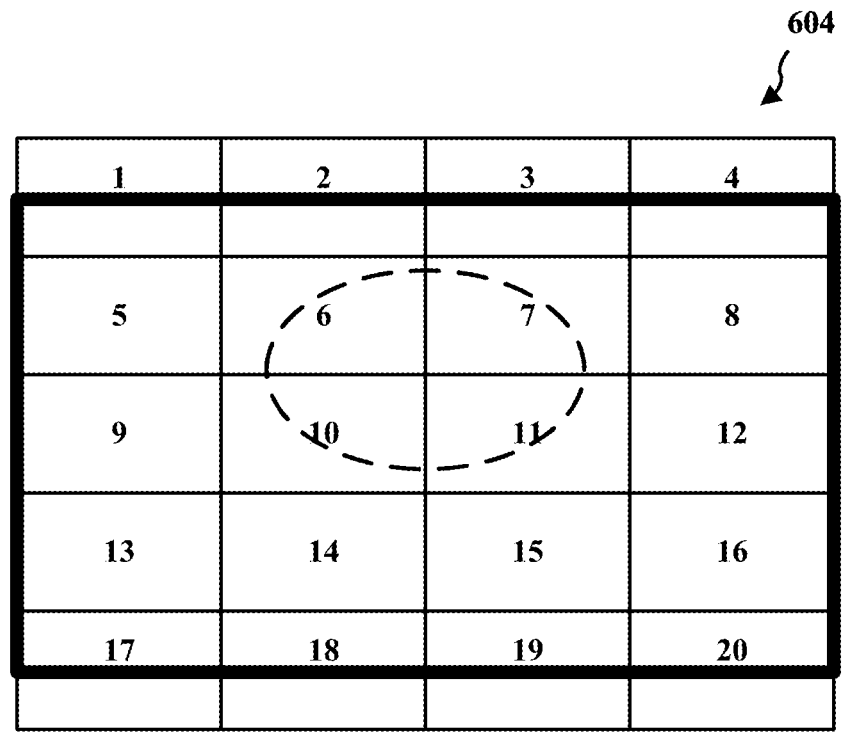
Figure 6C:
Figure 6C:
Figure 6C:

In some examples, a vertical shift may be less than the height of the bin in the standard layout. Otherwise described, the amount of the vertical shift may be a division (e.g., one-half or one-quarter) of the bin height in the standard layout. For example, the bin layout illustrated in FIG. 6C is a vertically shifted bin layout relative to the bin layout illustrated in FIG. 6B. The amount of the vertical shift in the example of FIG. 6C relative to the binning layout in the example of FIG. 6B is one-half of the bin height.

Figure 6D:
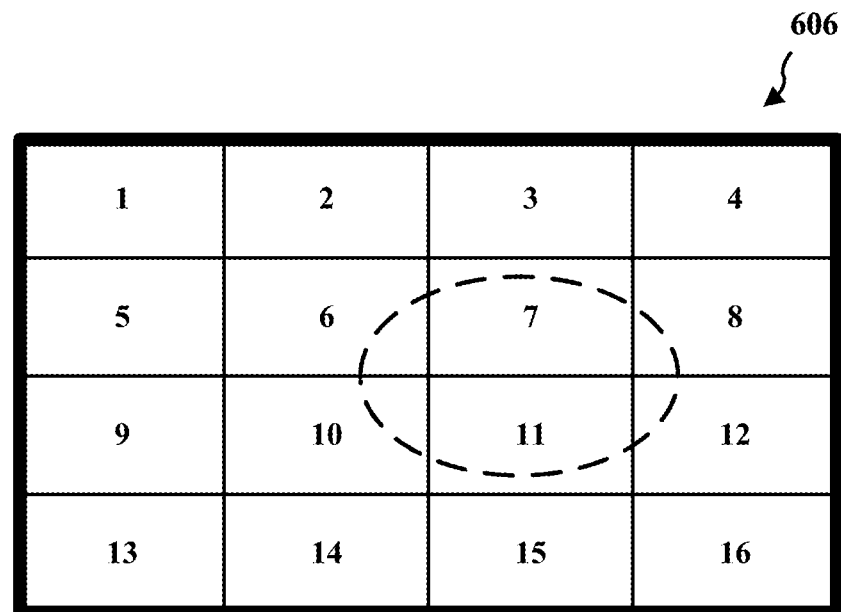
Figure 6D:
Figure 6D:
Figure 6D:
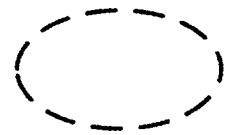
Figure 6E:
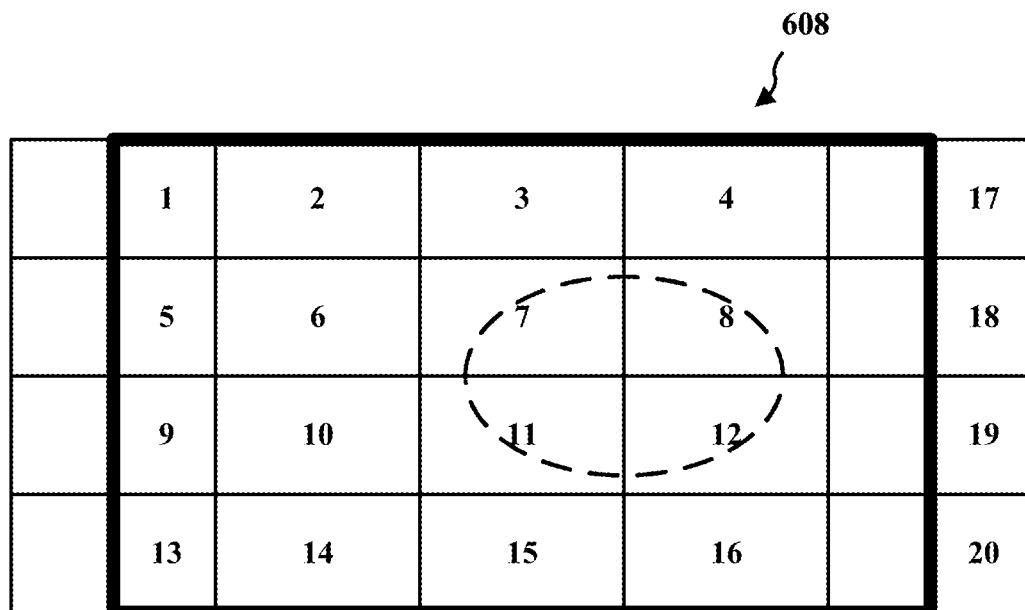
Figure 6E:
Figure 6E:
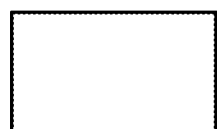
Figure 6E:
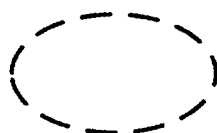

In some examples, a horizontal shift may be less than the width of the bin in the standard layout. Otherwise described, the amount of the horizontal shift may be a division (e.g., one-half or one-quarter) of the bin width in the standard layout. For example, the bin layout illustrated in FIG. 6E is a horizontal shifted bin layout relative to the bin layout illustrated in FIG. 6D. The amount of the horizontal shift in the example of FIG. 6E relative to the binning layout in the example of FIG. 6D is one-half of the bin width.

The bin layout selection occurs before a binning pass in which visibility information is generated for each bin of the selected bin layout. The second processing unit 106 may be configured to divide a framebuffer into a plurality of bins based on the selected bin layout. The second processing unit 106 may be configured to render graphical content for the framebuffer using the plurality of bins of a selected bin layout. These techniques may be referred to as the second processing unit 106 being configured to perform dynamic bin selection for foveated rendering in which a bin layout is selected from a plurality of bin layouts based on the information indicative of an eye gaze region. The selected bin layout has the least number of bins that overlap with the eye gaze region relative to the plurality of bin layouts. The selected bin layout may therefore be referred to as an optimal bin layout in some examples. For example, when adaptive rendering technique is used for foveated rendering, the bins overlapping with the eye gaze region may be rendered using a higher sample level than bins that do not overlap with the eye gaze region. In such an example, a fixed bin layout is not optimal from a performance and/or power consumption perspective because performing spatial anti-alias rendering with a higher sample level consumes more processing resources and power relative to performing spatial anti-alias rendering with a lower sample level. By dynamically selecting a bin layout from a plurality of bin layouts based on information indicative of an eye gaze region, the performance of the second processing unit 106 is improved because less bins may be processed using a higher sample level. The second processing unit 106 may be configured to select a bin layout prior to a binning pass being performed.

In some examples, the second processing unit 106 may be configured to implement one or more techniques described herein in conjunction with the dynamic bin selection for foveated rendering. For example, the second processing unit 106 may be configured to render bins that overlap with an eye gaze region using a tile-based rendering mode and render bins that do not overlap with an eye gaze region using a direct rendering mode. In some examples, spatial anti-alias rendering may be used for the bins that overlap with the eye gaze region and may or may not be used for bins that do not overlap with the eye gaze region.

As an example, FIG. 6B illustrates an example framebuffer 602 with an eye gaze region overlapping a first plurality of bins according to a first bin layout and FIG. 6C illustrates an example framebuffer 604 with the same eye gaze region overlapping a second plurality of bins according to a second bin layout. The dimensions are the same for the framebuffer 602 and the framebuffer 604. In the examples of FIGS. 6B and 6C, the bins have the same dimensions. The bin layout illustrated in FIG. 6C is a vertically shifted bin layout relative to the bin layout illustrated in FIG. 6B. In the example of FIG. 6B, the first bin layout includes 16 bins and bins 2, 3, 6, 7, 10, and 11 overlap with the eye gaze region. In the example of FIG. 6C, the second bin layout includes 20 bins and bins 6, 7, 10, and 11 overlap with the eye gaze region. The second bin layout includes eight trimmed or otherwise cropped bins: bins 1-4 and 13-16. The second processing unit 106 may be configured to select one of the bin layouts among a plurality of bin layouts. In this example, the plurality of bin layouts includes the first bin layout and the second bin layout. In other examples, the plurality of bin layouts may include two or more bin layouts.

To select the bin layout from the plurality of bin layouts, the second processing unit 106 may be configured to select the bin layout among the plurality of bin layouts that includes the least number of bins that overlap with the eye gaze region relative to the other bin layouts of the plurality of bin layouts. In the examples of FIGS. 6B and 6C, the second processing unit 106 may be configured to determine a respective number of bins that overlap with the eye gaze region for each respective bin layout of the plurality of bin layouts. For example, the second processing unit 106 may be configured to determine that the first bin layout includes 6 bins that overlap with the eye gaze region and determine that the second bin layout includes 4 bins that overlap with the eye gaze region. The second processing unit 106 may be configured to compare the respective numbers of bins that overlap with the eye gaze region corresponding to each respective bin layout to determine which bin layout has the least number of bins that overlaps with the eye gaze region. For example, in the examples of FIGS. 6B and 6C, the second processing unit 106 may be configured to determine that the respective number of bins that overlap with the eye gaze region for the second bin layout is less than the respective number of bins that overlap with the eye gaze region for the first bin layout.

The second processing unit 106 may be configured to select, based on information indicative of the eye gaze region, a bin layout from a plurality of bin layouts that is optimal to avoid excess overlapping of bins with the eye gaze region. Relative to FIG. 6C, the bin layout shown in FIG. 6B is not optimum because six bins overlap with the eye gaze region in FIG. 6B, whereas fewer bins overlap with the eye gaze region in FIG. 6C.

As another example, FIG. 6D illustrates an example framebuffer 606 with an eye gaze region overlapping a first plurality of bins according to a first bin layout and FIG. 6E illustrates an example framebuffer 608 with the same eye gaze region overlapping a second plurality of bins according to a second bin layout. The dimensions are the same for the framebuffer 606 and the framebuffer 608. In the examples of FIGS. 6D and 6E, the bins have the same dimensions. The bin layout illustrated in FIG. 6E is a horizontally shifted bin layout relative to the bin layout illustrated in FIG. 6D. In the example of FIG. 6D, the first bin layout includes 16 bins and bins 6-8 and 10-12 overlap with the eye gaze region. In the example of FIG. 6E, the second bin layout includes 20 bins and bins 7, 8, 11, and 12 overlap with the eye gaze region. The second bin layout includes eight trimmed or otherwise cropped bins: bin 1-4 and 17-20. The second processing unit 106 may be configured to select one of the bin layouts among a plurality of bin layouts. In this example, the plurality of bin layouts includes the first bin layout and the second bin layout. In other examples, the plurality of bin layouts may include two or more bin layouts.

To select the bin layout from the plurality of bin layouts, the second processing unit 106 may be configured to select the bin layout among the plurality of bin layouts that includes the least number of bins that overlap with the eye gaze region relative to the other bin layouts of the plurality of bin layouts. In the examples of FIGS. 6D and 6E, the second processing unit 106 may be configured to determine a respective number of bins that overlap with the eye gaze region for each respective bin layout of the plurality of bin layouts. For example, the second processing unit 106 may be configured to determine that the first bin layout includes 6 bins that overlap with the eye gaze region and determine that the second bin layout includes 4 bins that overlap with the eye gaze region. The second processing unit 106 may be configured to compare the respective numbers of bins that overlap with the eye gaze region corresponding to each respective bin layout to determine which bin layout has the least number of bins that overlaps with the eye gaze region. For example, in the examples of FIGS. 6D and 6E, the second processing unit 106 may be configured to determine that the respective number of bins that overlap with the eye gaze region for the second bin layout is less than the respective number of bins that overlap with the eye gaze region for the first bin layout.

The second processing unit 106 may be configured to select, based on information indicative of the eye gaze region, a bin layout from a plurality of bin layouts that is optimal to avoid excess overlapping of bins with the eye gaze region. Relative to FIG. 6E, the bin layout shown in FIG. 6D is not optimum because six bins overlap with the eye gaze region in FIG. 6D, whereas fewer bins overlap with the eye gaze region in FIG. 6E.

Figure 6F:
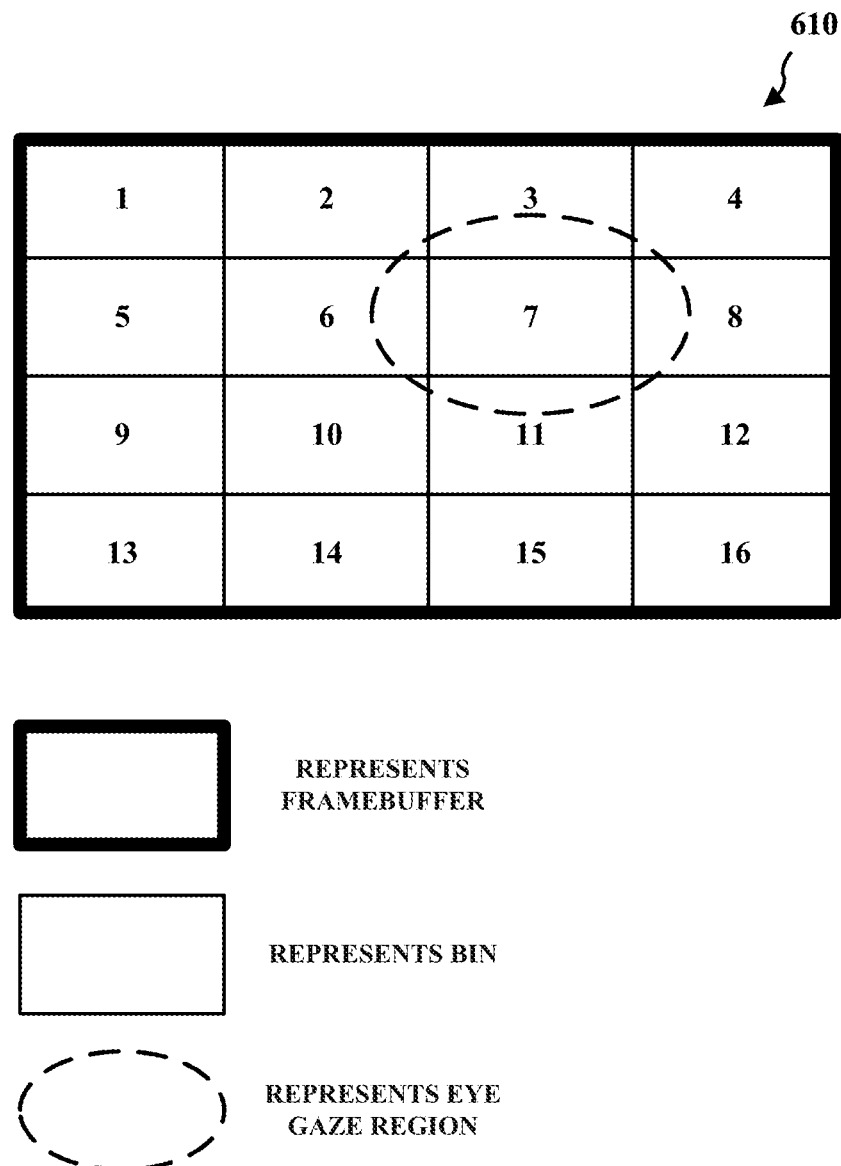
Figure 6G:
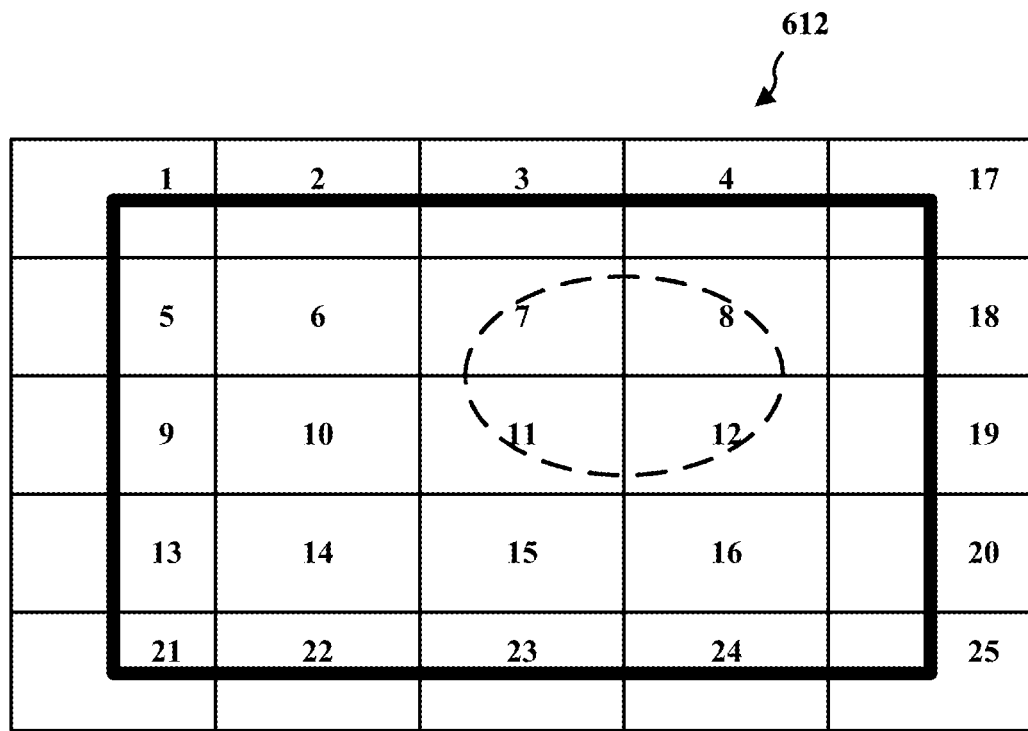
Figure 6G:
Figure 6G:
Figure 6G:
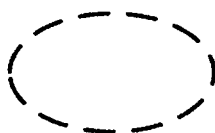

As another example, FIG. 6F illustrates an example framebuffer 610 with an eye gaze region overlapping a first plurality of bins according to a first bin layout and FIG. 6G illustrates an example framebuffer 612 with the same eye gaze region overlapping a second plurality of bins according to a second bin layout. The dimensions are the same for the framebuffer 610 and the framebuffer 612. In the examples of FIGS. 6F and 6G, the bins have the same dimensions. The bin layout illustrated in FIG. 6G is a vertically and horizontally shifted bin layout relative to the bin layout illustrated in FIG. 6F. In the example of FIG. 6F, the first bin layout includes 16 bins and bins 2-4, 6-8, and 10-12 overlap with the eye gaze region. In the example of FIG. 6G, the second bin layout includes 25 bins and bins 7, 8, 11, and 12 overlap with the eye gaze region. The second bin layout includes sixteen trimmed or otherwise cropped bins: bin 1-5, 9, 13, and 17-25. The second processing unit 106 may be configured to select one of the bin layouts among a plurality of bin layouts. In this example, the plurality of bin layouts includes the first bin layout and the second bin layout. In other examples, the plurality of bin layouts may include two or more bin layouts.

To select the bin layout from the plurality of bin layouts, the second processing unit 106 may be configured to select the bin layout among the plurality of bin layouts that includes the least number of bins that overlap with the eye gaze region relative to the other bin layouts of the plurality of bin layouts. In the examples of FIGS. 6F and 6G, the second processing unit 106 may be configured to determine a respective number of bins that overlap with the eye gaze region for each respective bin layout of the plurality of bin layouts. For example, the second processing unit 106 may be configured to determine that the first bin layout includes 9 bins that overlap with the eye gaze region and determine that the second bin layout includes 4 bins that overlap with the eye gaze region. The second processing unit 106 may be configured to compare the respective numbers of bins that overlap with the eye gaze region corresponding to each respective bin layout to determine which bin layout has the least number of bins that overlaps with the eye gaze region. For example, in the examples of FIGS. 6F and 6G, the second processing unit 106 may be configured to determine that the respective number of bins that overlap with the eye gaze region for the second bin layout is less than the respective number of bins that overlap with the eye gaze region for the first bin layout.

The second processing unit 106 may be configured to select, based on information indicative of the eye gaze region, a bin layout from a plurality of bin layouts that is optimal to avoid excess overlapping of bins with the eye gaze region. Relative to FIG. 6G, the bin layout shown in FIG. 6F is not optimum because nine bins overlap with the eye gaze region in FIG. 6F, whereas fewer bins overlap with the eye gaze region in FIG. 6G.

In accordance with the techniques described herein, the second processing unit 106 may be configured to generate a sample count buffer for foveated rendering based on information indicative of an eye gaze region. The sample count buffer enables more efficient generation of graphical content using foveated rendering by, for example, reducing the number of samples that are fragment shaded following rasterization. A sample count buffer includes a respective sample count for each respective pixel of a plurality of pixels of a framebuffer. The respective sample count for each respective pixel indicates a respective number of samples required to fragment shade the respective pixel.

Figure 6H:
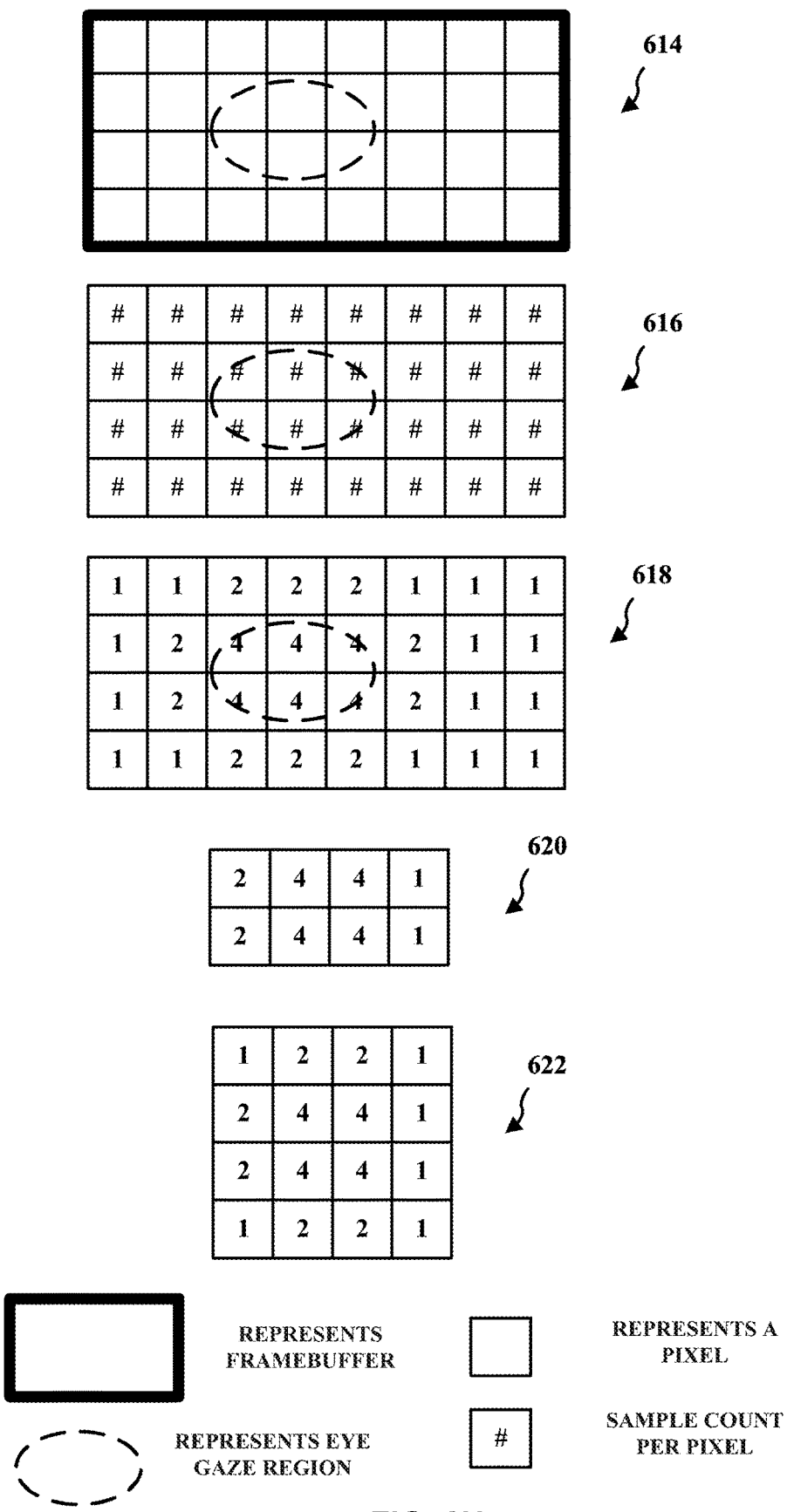
FIG. 6H illustrates an example framebuffer, examples of a sample count buffer, and examples of a compressed sample count buffer.

As an example, FIG. 6H illustrates an example framebuffer 614 that is 8×4 pixels in size and an example sample count buffer 616 that is 8×4 pixels in size. It is understood that the size of the framebuffer 614 and the sample count buffer 616 are the same size, and may be any size. Each pixel may have its own respective sample count value. As an example, sample count buffer 618 is an example of sample count buffer 616 but with example sample count values for each pixel. In this example, the pixels overlapping with the eye gaze region have a higher sample count than the pixels that do not overlap with the eye gaze region. For example, in the example sample count buffer 618, the pixels that overlap with the eye gaze region have a sample count of 4, and pixels that do not overlap with the eye gaze region have a sample count less than four. In this example, the pixels near the eye gaze region have a sample count of 2 and pixels further away from the eye gaze region have sample count of 1. In other examples, these values may differ.

The second processing unit 106 may be configured to generate an intermediate buffer for spatial anti-alias rendering. The intermediate buffer is an upsampled version of the framebuffer. For example, an 8×4 framebuffer may be upsampled to 16×8 if the sample level correspond to the spatial anti-alias rendering is 2× (i.e., two samples will be produced for each respective pixel). Therefore, the intermediate buffer may be described as being generated based on the framebuffer and a sample level corresponding to the spatial anti-alias rendering. For example, the second processing unit 106 may be configured to rasterize the graphical content using spatial anti-alias rendering to produce a plurality of samples per pixel. During rasterization, the information indicative of the eye gaze region may not be used. Otherwise described, the second processing unit 106 may be configured to perform spatial anti-alias rasterization without adjusting the rasterization based on the eye gaze region. However, in accordance with the techniques described herein, the second processing unit 106 may be configured to control how many samples are to be used for fragment shading. This control enables the second processing unit 106 to reduce the processing load because less samples are fragment shaded.

The intermediate buffer may be configured to store a first plurality of samples at a first sample count per pixel. The framebuffer may be configured to store a second plurality of samples at a second sample count per pixel. The first plurality of samples may be greater than the second plurality of samples. The first sample count per pixel may be higher than the second sample count per pixel. The first sample count per pixel is two or more samples per pixel. The second sample count per pixel is one sample per pixel. The intermediate buffer may be a first size with first dimensions. The framebuffer and the sample count buffer may be a second size with second dimensions. The first size may be larger than the second size.

The second processing unit 106 may be configured to render (e.g., raster) each respective pixel of the plurality of pixels at the first sample count to generate the first plurality of samples. In terms of this example, rendering (e.g., rasterizing) refers to rasterization to produce unshaded samples. Otherwise described, the first plurality of samples have yet to be fragment shaded. The first plurality of samples may be rendered into the intermediate buffer at the highest sample level of the sample count buffer. For example, the example sample count buffer 618 includes three sample levels: 1×, 2×, and 4×. Since 4× is the highest sample level, the second processing unit 106 may be configured to render each pixel corresponding to the framebuffer 614 to generate four samples for every pixel. The four samples for every pixel may be stored in the intermediate buffer. For example, the example framebuffer 614 is 8×4 pixels in size. However, the intermediate buffer to which the four samples for every pixel is rendered into would be 32×16 pixels in size based on the 4$x$ sample level.

The second processing unit 106 may be configured to control how many samples stored in the intermediate buffer are to be used for fragment shading based on the sample count buffer. For example, the second processing unit 106 may be configured to control, based on the respective sample count in the sample count buffer for each respective pixel, how many samples of the generated first plurality of samples for each respective pixel of the plurality of pixels are to be used for fragment shading. In some examples, to control how many samples of the generated first plurality of samples for each respective pixel of the plurality of pixels are to be used for fragment shading, the second processing unit 106 may be configured to (1) allow all samples generated for pixels that overlap with the eye gaze region to be used for fragment shading, and (2) allow less than all samples generated for pixels that do not overlap with the eye gaze region. For example, the second processing unit 106 may be configured to only allow a number of samples for each respective pixel based on the respective sample count corresponding to the respective pixel in the sample count buffer. As an example, referring to FIG. 6H, the second processing unit 106 may be configured to allow only one respective sample among the four samples generated for each respective pixel that has a sample count of 1 in the sample count buffer 618. As another example, referring to FIG. 6H, the second processing unit 106 may be configured to allow only two respective samples among the four samples generated for each respective pixel that has a sample count of 2 in the sample count buffer 618. As another example, referring to FIG. 6H, the second processing unit 106 may be configured to allow all four samples generated for each respective pixel that has a sample count of 4 in the sample count buffer 618. Otherwise described, referring to FIG. 6H, the second processing unit 106 may be configured to perform fragment shading on only one respective sample among the four samples generated for each respective pixel that has a sample count of 1 in the sample count buffer 618. As another example, referring to FIG. 6H, the second processing unit 106 may be configured to perform fragment shading on only two respective samples among the four samples generated for each respective pixel that has a sample count of 2 in the sample count buffer 618. As another example, referring to FIG. 6H, the second processing unit 106 may be configured to perform fragment shading on all four samples generated for each respective pixel that has a sample count of 4 in the sample count buffer 618.

In some examples, the second processing unit 106 may be configured to compress the sample count buffer. In such examples, to compress the sample count buffer, the second processing unit 106 may be configured to divide the sample count buffer into a plurality of blocks. Each respective block of the plurality of blocks may include two or more respective sample counts. Each respective block of the plurality of blocks has a size of N×M sample counts, wherein N represents a number of respective sample counts of the two or more respective sample counts along a first axis and M represents a number of respective sample counts of the two or more respective sample counts along a second axis. In some examples, N is equal to M. In other examples, N is unequal to M. For example, N may be greater than M, or N may be less than M.

In some examples, to compress the sample count buffer, the second processing unit 106 may be configured to determine, for each respective block of the plurality of blocks, a highest sample count among the two or more respective sample counts in the respective block. The second processing unit 106 may be configured to store, for each respective block of the plurality of blocks, a single respective sample count for each respective block of the plurality of blocks into a compressed sample count buffer. The single respective sample count for each respective block may be the determined highest sample count and represents the sample count for each respective pixel corresponding to the respective block.

As an example, FIG. 6H illustrates as example of a compressed sample count buffer 620 generated from the sample count buffer 618. To generate the compressed sample count buffer 620, the second processing unit 106 divided the sample count buffer 618 into 2×2 blocks and determined, for each block, the highest sample count among the four sample counts in each block. As another example, FIG. 6H illustrates as example of a compressed sample count buffer 622 generated from the sample count buffer 618. To generate the compressed sample count buffer 622, the second processing unit 106 divided the sample count buffer 618 into 2×1 blocks and determined, for each block, the highest sample count among the four sample counts in each block. By reducing the size of the data structure, less memory space is consumed when storing the compressed data structure. In some examples, an intermediate buffer may be stored in the internal memory 107 and/or the memory 110. In some examples, a sample count buffer may be stored in the internal memory 107 and/or the memory 110. In some examples, a compressed sample count buffer may be stored in the internal memory 107 and/or the memory 110.

Referring back to FIG. 1, the third processing unit 108 may be configured to perform one or more display processing processes 122 in accordance with the techniques described herein. For example, the third processing unit 108 may be configured to perform one or more display processing techniques on one or more frames generated by the second processing unit 106 before presentment by the display 103. Otherwise described, the third processing unit 108 may be configured to perform display processing. In some examples, the one or more display processing processes 122 may include one or more of a rotation operation, a blending operation, a scaling operating, any display processing process/operation, or any process/operation described herein with respect to the third processing unit 108.

In some examples, the one or more display processing processes 122 include any process/operation described herein with respect to the third processing unit 108. The display 103 may be configured to display content that was generated using the display processing pipeline 102. For example, the second processing unit 106 may generate graphical content based on commands/instructions received from the first processing unit 104. The graphical content may include one or more layers. Each of these layers may constitute a frame of graphical content. The third processing unit 108 may be configured to perform composition on graphical content rendered by the second processing unit 106 to generate display content. Display content my constitute a frame for display. The frame for display may include two or more layers/frames that were blended together by the third processing unit 108.

The device 100 may include or be connected to one or more input devices 113. In some examples, the one or more input devices 113 may include one or more of: a touch screen, a mouse, a peripheral device, an audio input device (e.g., a microphone or any other visual input device), an eye gaze input device (which may be referred to as an eye gaze tracker, an eye tracker, an eye gaze sensor, eye movement tracker, an eye movement sensor, an eye sensor, or the like), a visual input device (e.g., a camera, an eye tracker, or any other visual input device), any user input device, or any input device configured to receive an input from a user. In some examples, the display 103 may be a touch screen display; and, in such examples, the display 103 constitutes an example input device 113.

In the example of FIG. 1A, the one or more input devices 113 is shown as including an eye gaze input device 113-1. The eye gaze input device 113-1 may be configured to determine where a user of device 100 is looking, such as where a user is looking on a display (e.g., the display 103). Otherwise described, the eye gaze input device 113-1 may be configured to generate information indicative of an eye gaze region. The eye gaze region may be a region where the user of the device 100 is looking. In some examples, the eye gaze region may be referred to as a fovea/foveated region or a fixation point region. The information indicative of an eye gaze region may include information indicative of one or more regions, such as the eye gaze region (e.g., a fovea region) and/or one or more regions outside of the eye gaze region (e.g., a peripheral region). In some examples, the peripheral region may be the region that falls outside of the eye gaze region.

The eye gaze input device 113-1 may be configured to provide the information indicative of the eye gaze region to the first processing unit 104 and/or the second processing unit 106. In some examples, the first processing unit 104 may be configured to receive the information indicative of the eye gaze region from the eye gaze input device 113-1 and further process the information to generate processed information indicative of the eye gaze region. For example, the first processing unit 104 may be configured to adjust the size of the eye gaze region corresponding to the information indicative of the eye gaze region received from the eye gaze input device 113-1. In other examples, the first processing unit 104 may be configured to receive the information indicative of the eye gaze region from the eye gaze input device 113-1 and forward it to the second processing unit 106. In accordance with the techniques described herein, the second processing unit 106 may be configured to receive information indicative of an eye gaze region from any component, such as the first processing unit 104 or the eye gaze input device 113-1. The information indicative of an eye gaze region received by the second processing unit 106 may be generated by the eye gaze input device 113-1 and processed by zero or more other components before being received by the second processing unit 106.

It is understood that the output of an input device may constitute an input to a component receiving the output from the input device. The eye gaze input device 113-1 may be integrated with the device 100 so that the eye gaze input device 113-1 is configured to detect where a user is looking relative to the display 103.

The display processing pipeline 102 may be configured to execute one or more applications. For example, the first processing unit 104 may be configured to execute one or more applications 120. The first processing unit 104 may be configured to cause the second processing unit 106 to generate content for the one or more applications 120 being executed by the first processing unit 104. Otherwise described, execution of the one or more applications 120 by the first processing unit 104 may cause the generation of graphical content by a graphics processing pipeline 111. For example, the first processing unit 104 may issue or otherwise provide instructions (e.g., draw instructions) to the second processing unit 106 that cause the second processing unit 106 to generate graphical content based on the instructions received from the first processing unit 104. The second processing unit 106 may be configured to generate one or more layers for each application of the one or more applications 120 executed by the first processing unit 104. Each layer generated by the second processing unit 106 may be stored in a buffer (e.g., a framebuffer). Otherwise described, the buffer may be configured to store one or more layers of graphical content rendered by the second processing unit 106. The buffer may reside in the internal memory 107 of the second processing unit 106 and/or the memory 110 (which may be system memory of the device 100 in some examples). Each layer produced by the second processing unit 106 may constitute graphical content. The one or more layers may correspond to a single application or a plurality of applications. The second processing unit 106 may be configured to generate multiple layers of content, meaning that the first processing unit 104 may be configured to cause the second processing unit 106 to generate multiple layers of content.

Figure 1B:
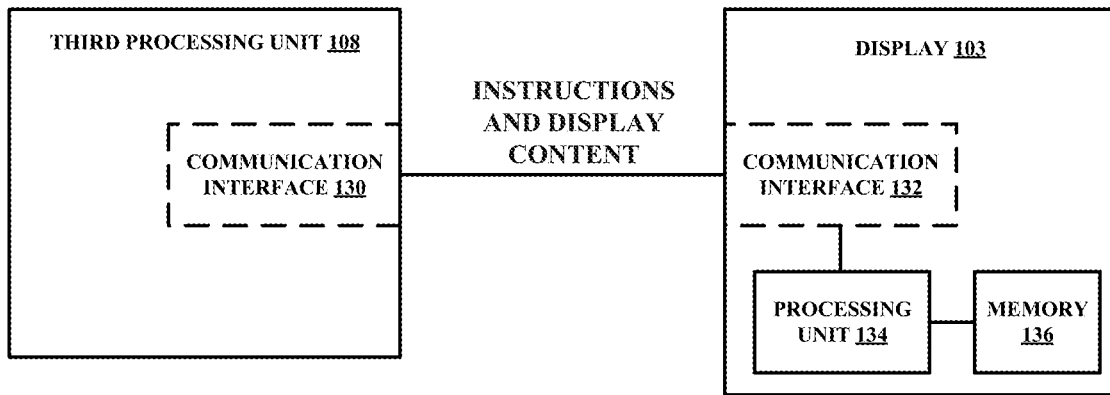
FIG. 1B is a block diagram that illustrates an example configuration between a component of the device depicted in FIG. 1A and a display.

FIG. 1B is a block diagram that illustrates an example configuration between the third processing unit 108 of the device and the display 103. The example of display 103 in FIG. 1B is an example of a smart panel or a command mode panel. The third processing unit 108 and the display 103 may be configured to communicate with each other over a communication medium (e.g., a wired and/or wireless communication medium). For example, the third processing unit 108 may include a communication interface 130 (e.g., a bus interface) and the display 103 may include a communication interface 132 (e.g., a bus interface) that enables communication between each other. In some examples, the communication between the third processing unit 108 and the display 103 may be compliant with a communication standard, communication protocol, or the like. For example, the communication between the third processing unit 108 and the display 103 may be compliant with the Display Serial Interface (DSI) standard. In some examples, the third processing unit 108 may be configured to provide data (e.g., display content) to the display 103 for presentment thereon. The third processing unit 108 may also be configured to provide commands/instructions to the display 103, such as when the display 103 is a command mode display. The display 103 may include a processing unit 134 and a memory 136 accessible by the processing unit 134. The processing unit 134 may be referred to as a display controller. The memory 136 may be configured to store data that the display 103 receives from the third processing unit 108. For example, the memory 136 may be configured to store (e.g., buffer) frames received from the third processing unit 108. The processing unit 134 may be configured to read data stored in the memory 136 that was received from the third processing unit 108 and drive the display 103 based on one or more commands received from the third processing unit 108.

Figure 1C:
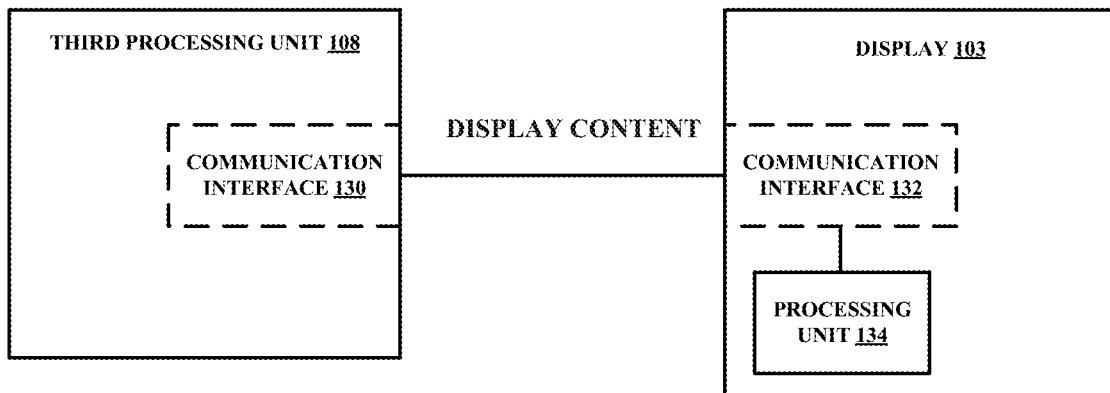
FIG. 1C is a block diagram that illustrates an example configuration between a component of the device depicted in FIG. 1A and a display.

FIG. 1C is a block diagram that illustrates an example configuration between the third processing unit 108 of the device and the display 103. The example of display 103 in FIG. 1C is an example of a dumb panel or a video mode panel. The third processing unit 108 and the display 103 may be configured to communicate with each other over a communication medium (e.g., a wired and/or wireless communication medium). For example, the third processing unit 108 may include a communication interface 130 (e.g., a bus interface) and the display 103 may include a communication interface 132 (e.g., a bus interface) that enables communication between each other. In some examples, the communication between the third processing unit 108 and the display 103 may be compliant with a communication standard, communication protocol, or the like. For example, the communication between the third processing unit 108 and the display 103 may be compliant with the Display Serial Interface (DSI) standard. In some examples, the third processing unit 108 may be configured to provide data (e.g., display content) to the display 103 for presentment thereon. The display 103 may include a processing unit 134 and may not include a memory. The processing unit 134 may be referred to as a display driver. The processing unit 134 may be configured to cause the display content received from the third processing unit 108 to be displayed on the display 103.

In some examples, one or more components of the device 100 and/or display processing pipeline 102 may be combined into a single component. For example, one or more components of the display processing pipeline 102 may be one or more components of a system on chip (SoC), in which case the display processing pipeline 102 may still include the first processing unit 104, the second processing unit 106, and the third processing unit 108; but as components of the SoC instead of physically separate components. In other examples, one or more components of the display processing pipeline 102 may be physically separate components that are not integrated into a single component. For example, the first processing unit 104, the second processing unit 106, and the third processing unit 108 may each be a physically separate component from each other. It is appreciated that a display processing pipeline may have different configurations. As such, the techniques described herein may improve any display processing pipeline and/or display, not just the specific examples described herein.

In some examples, one or more components of the display processing pipeline 102 may be integrated into a motherboard of the device 100. In some examples, one or more components of the display processing pipeline 102 may be present on a graphics card of the device 100, such as a graphics card that is installed in a port in a motherboard of the device 100 or a graphics card incorporated within a peripheral device configured to interoperate with the device 100.

The first processing unit 104, the second processing unit 106, and/or the third processing unit 108 may include one or more processors, such as one or more microprocessors, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. In examples where the techniques described herein are implemented partially in software, the software (instructions, code, or the like) may be stored in a suitable, non-transitory computer-readable storage medium accessible by the processing unit. The processing unit may execute the software in hardware using one or more processors to perform the techniques of this disclosure. For example, one or more components of the display processing pipeline 102 may be configured to execute software. The software executable by the first processing unit 104 may be stored in the internal memory 105 and/or the memory 110. The software executable by the second processing unit 106 may be stored in the internal memory 107 and/or the memory 110. The software executable by the third processing unit 108 may be stored in the internal memory 109 and/or the memory 110.

As described herein, a device, such as the device 100, may refer to any device, apparatus, or system configured to perform one or more techniques described herein. For example, a device may be a server, a base station, user equipment, a client device, a station, an access point, a computer (e.g., a personal computer, a desktop computer, a laptop computer, a tablet computer, a computer workstation, or a mainframe computer), an end product, an apparatus, a phone, a smart phone, a server, a video game platform or console, a handheld device (e.g., a portable video game device or a personal digital assistant (PDA)), a wearable computing device (e.g., a smart watch, an augmented reality (AR) device, or a virtual reality (VR) device), a non-wearable device (e.g., a non-wearable AR device or a non-wearable VR device), any AR device, any VR device, a display (e.g., display device), a television, a television set-top box, an intermediate network device, a digital media player, a video streaming device, a content streaming device, an in-car computer, any mobile device, any device configured to generate content, or any device configured to perform one or more techniques described herein. In some examples, the device 100 may be an apparatus. The apparatus may be a processing unit, an SOC, or any device.

As described herein, devices, components, or the like may be described herein as being configured to communicate with each other. For example, one or more components of the display processing pipeline 102 may be configured to communicate with one or more other components of the device 100, such as the display 103, the memory 110, and/or one or more other components of the device 100 (e.g., one or more input devices). One or more components of the display processing pipeline 102 may be configured to communicate with each other. For example, the first processing unit 104 may be communicatively coupled to the second processing unit 106 and/or the third processing unit 108. As another example, the second processing unit 106 may be communicatively coupled to the first processing unit 104 and/or the third processing unit 108. As another example, the third processing unit 108 may be communicatively coupled to the first processing unit 104 and/or the second processing unit 106.

As described herein, communication may include the communicating of information from a first component to a second component (or from a first device to a second device). The information may, in some examples, be carried in one or more messages. As an example, a first component in communication with a second component may be described as being communicatively coupled to or otherwise with the second component. For example, the first processing unit 104 and the second processing unit 106 may be communicatively coupled. In such an example, the first processing unit 104 may communicate information to the second processing unit 106 and/or receive information from the second processing unit 106.

In some examples, the term "communicatively coupled" may refer to a communication connection, which may be direct or indirect. A communication connection may be wired and/or wireless. A wired connection may refer to a conductive path, a trace, or a physical medium (excluding wireless physical mediums) over which information may travel. A conductive path may refer to any conductor of any length, such as a conductive pad, a conductive via, a conductive plane, a conductive trace, or any conductive medium. A direct communication connection may refer to a connection in which no intermediary component resides between the two communicatively coupled components. An indirect communication connection may refer to a connection in which at least one intermediary component resides between the two communicatively coupled components. In some examples, a communication connection may enable the communication of information (e.g., the output of information, the transmission of information, the reception of information, or the like). In some examples, the term "communicatively coupled" may refer to a temporary, intermittent, or permanent communication connection.

Any device or component described herein may be configured to operate in accordance with one or more communication protocols. For example, a first and second component may be communicatively coupled over a connection. The connection may be compliant or otherwise be in accordance with a communication protocol. As used herein, the term "communication protocol" may refer to any communication protocol, such as a communication protocol compliant with a communication standard or the like. As an example, a communication protocol may include the Display Serial Interface (DSI) protocol. DSI may enable communication between the third processing unit 108 and the display 103 over a connection, such as a bus.

Figure 2A:
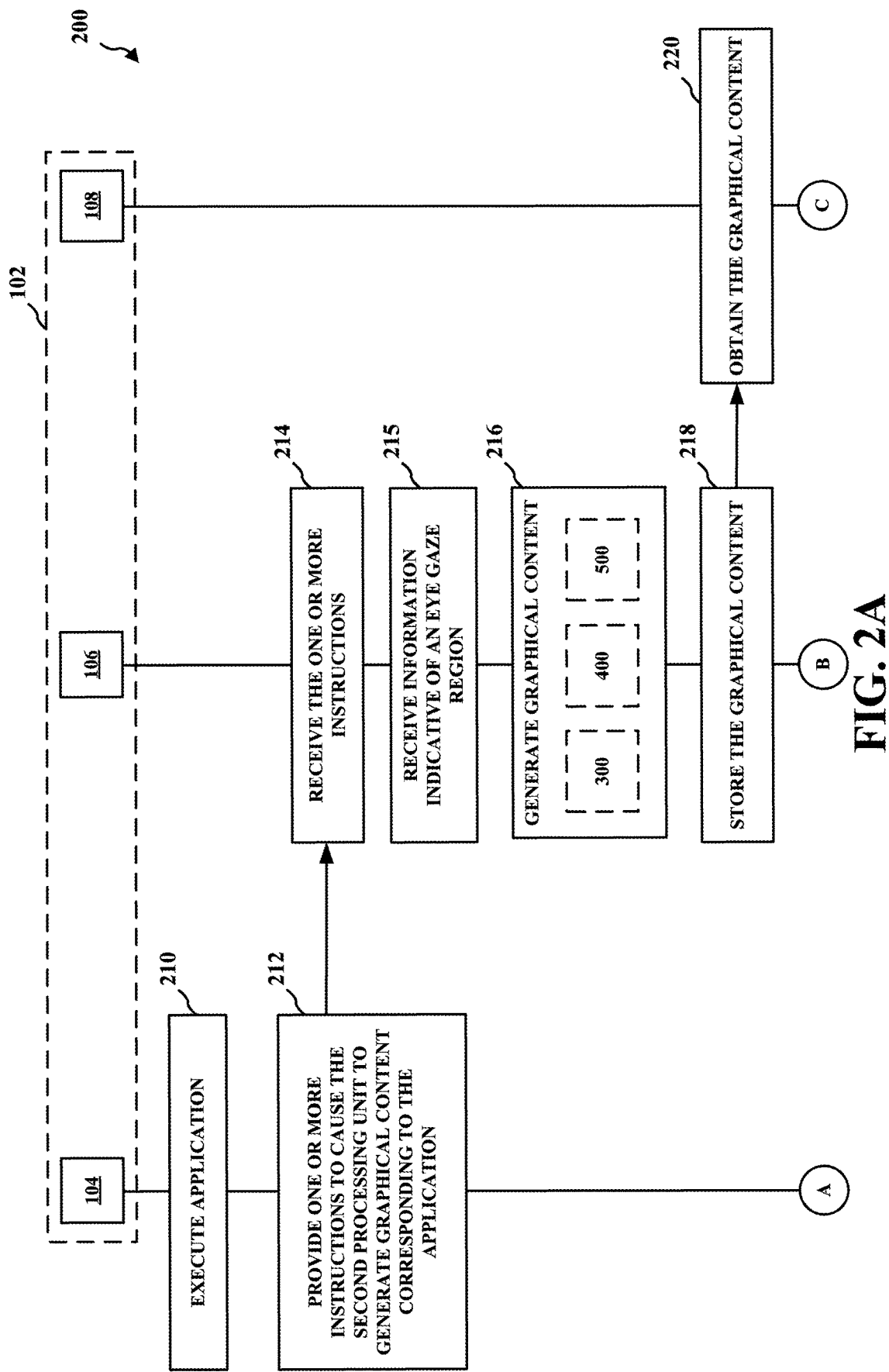
FIGS. 2A-2B illustrate an example flow diagram in accordance with the techniques described herein.
Figure 2B:
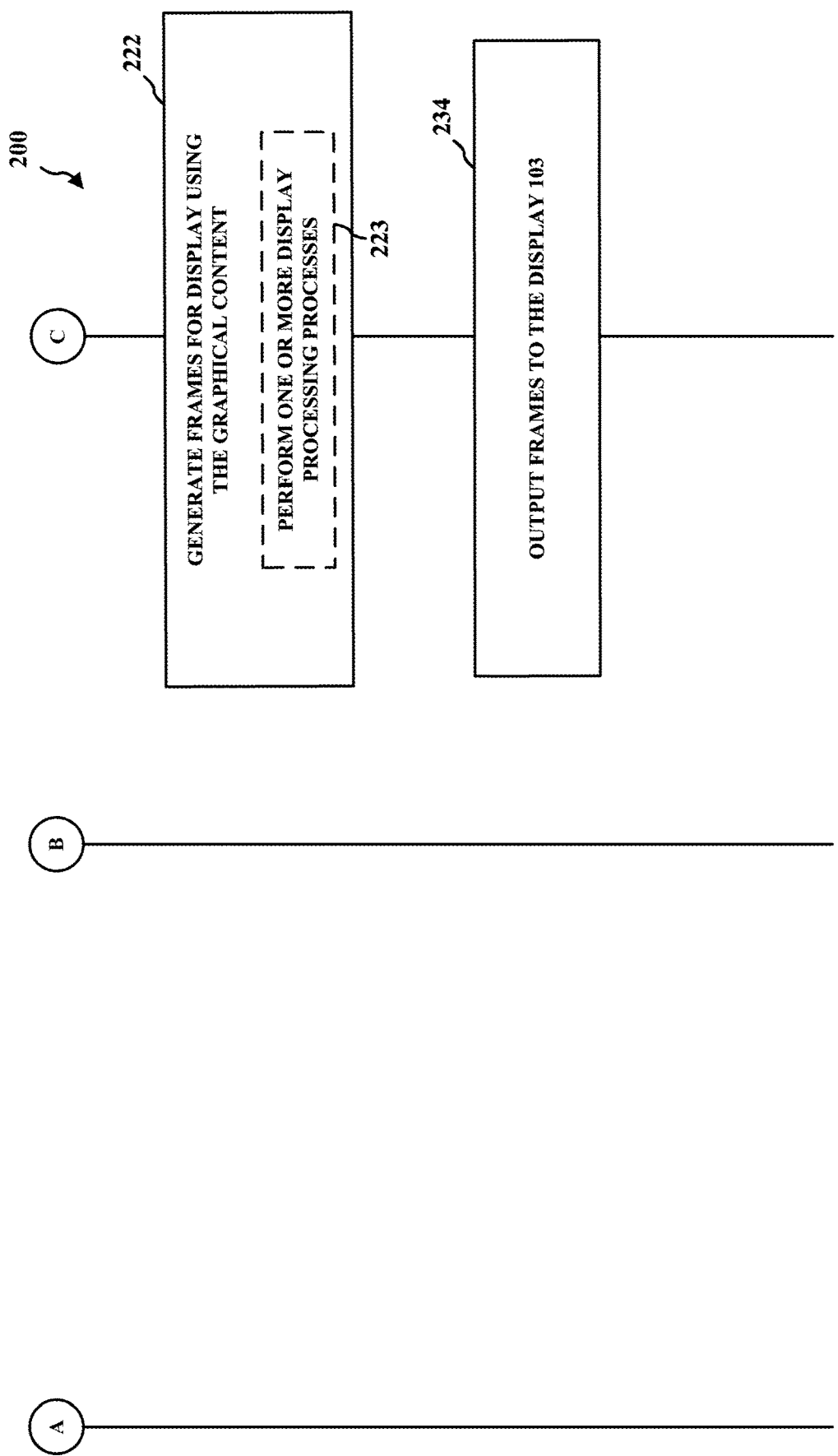

FIGS. 2A-B illustrate an example flow diagram 200 in accordance with the techniques described herein. In other examples, one or more techniques described herein may be added to the flow diagram 200 and/or one or more techniques depicted in the flow diagram may be removed. One or more blocks shown in FIGS. 2A-B may be performed in parallel.

In the example of FIGS. 2A-B, at block 210, the first processing unit 104 may be configured to execute an application. At block 212, the first processing unit 104 may be configured to provide one or more instructions to the second processing unit 106 to cause the second processing unit 106 to generate graphical content corresponding to the application. At block 214, the second processing unit 106 may be configured to receive the one or more instructions. At block 215, the second processing unit 106 may be configured to receive information indicative of an eye gaze region. In some examples, the second processing unit 106 may be configured to receive information indicative of an eye gaze region from the first processing unit 104 and/or the eye gaze input device 113-1.

At block 216, the second processing unit 106 may be configured to generate the graphical content based on the one or more instructions received from the first processing unit 104 and based on the information indicative of the eye gaze region. For example, the second processing unit 106 may be configured to generate the graphical content at block 216 in accordance with one or more techniques described herein, such as in accordance with the example flowchart 300, the example, flowchart 400, and/or the example flowchart 500. The graphical content may include one or more frames.

At block 218, the second processing unit 106 may be configured store the generated graphical content (e.g., in the internal memory 107 and/or the memory 110) as described herein. Therefore, block 218 generally represents the rendered graphical content that may be stored in one or more memories during rendering. For example, the second processing unit 106 may be configured to use the internal memory 107 and/or the memory 110 to store rendered graphical content. To the extent the internal memory 107 is used to store rendered graphical content, the second processing unit 106 may be configured store the rendered graphical content from the internal memory 107 to the memory 110. The location in the memory 110 at which the rendered graphical content is stored may be referred to as a framebuffer.

At block 220, the third processing unit 208 may be configured to obtain the generated graphical content from a framebuffer. For example, the third processing unit 208 may be configured to obtain one or more frames of generated graphical content from the memory 110. At block 222, the third processing unit 208 may be configured to generate frames for display using the generated graphical content obtained from the framebuffer. To generate display content, the third processing unit 108 may be configured to perform one or more display processing processes 223 (e.g., composition display processes, such as blending, rotation, or any other composition display process) on the generated graphical content read from the framebuffer. At block 234, the third processing unit 108 may be configured to output display content to the display 103.

Figure 3:
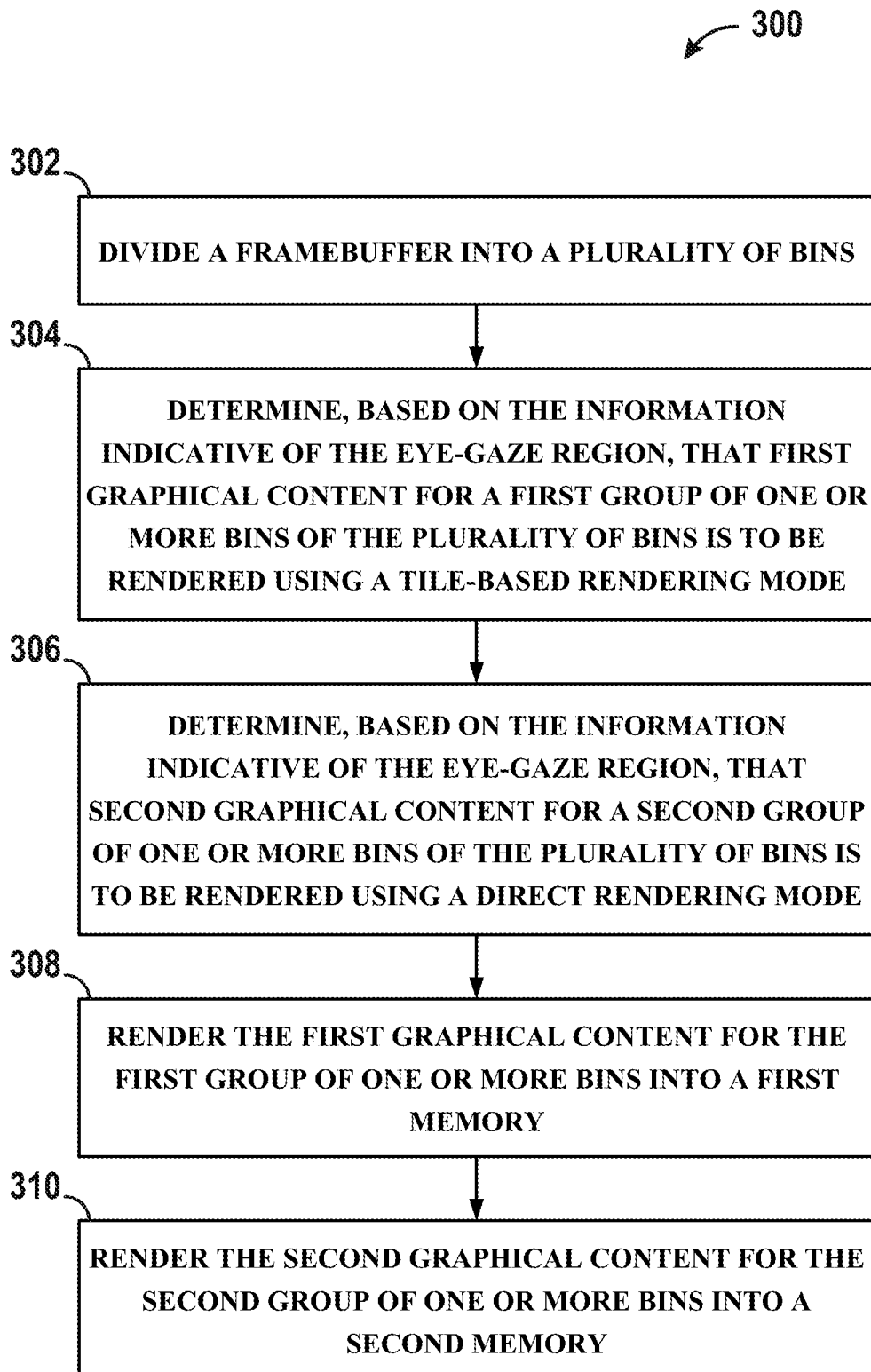
FIG. 3 illustrates an example flowchart of an example method in accordance with one or more techniques of this disclosure.

FIG. 3 illustrates an example flowchart 300 of a method in accordance with one or more techniques of this disclosure. The method may be performed by the second processing unit 106. In some examples, the method illustrated in flowchart 300 may include one or more functions described herein that are not illustrated in FIG. 3, and/or may exclude one or more illustrated functions.

At block 302, the second processing unit 106 may be configured to divide a framebuffer into a plurality of bins. At block 304, the second processing unit 106 may be configured to determine, based on the information indicative of the eye gaze region, first graphical content for a first group of one or more bins of the plurality of bins is to be rendered using a tile-based rendering mode. At block 306, the second processing unit 106 may be configured to determine, based on the information indicative of the eye gaze region, second graphical content for a second group of one or more bins of the plurality of bins is to be rendered using a direct rendering mode.

To determine that first graphical content for the first group of one or more bins of the plurality of bins is to be rendered using the tile-based rendering mode, the second processing unit 106 may be configured to determine that a first bin of the plurality of bins overlaps with the eye gaze region. To determine that second graphical content for the second group of one or more bins of the plurality of bins is to be rendered using the direct rendering mode, the second processing unit 106 may be configured to determine that a second bin of the plurality of bins does not overlap with the eye gaze region.

At block 308, the second processing unit 106 may be configured to render the first graphical content for the first group of one or more bins into a first memory. At block 310, the second processing unit 106 may be configured to render the second graphical content for the second group of one or more bins into a second memory. The first memory may be the internal memory 107 and the second memory may be the memory 110. To render the first graphical content for the first group of one or more bins into the first memory, the second processing unit 106 may be configured to render the first bin into the first memory. To render the second graphical content for the second group of one or more bins into the second memory, the second processing unit 106 may be configured to render the second bin into the second memory.

To render the first graphical content for the first group of one or more bins into the first memory, the second processing unit 106 may be configured to render the first graphical content for the first group of one or more bins at a first quality. To render the second graphical content for the second group of one or more bins into the second memory, the second processing unit 106 may be configured to render the second graphical content for the second group of one or more bins at a second quality. The first quality may be higher than the second quality. In some examples, to render the first graphical content for the first group of one or more bins at the first quality, the second processing unit 106 may be configured to render the first graphical content for the first group of one or more bins using spatial anti-aliasing of a first sample level; and to render the second graphical content for the second group of one or more bins at the second quality, the second processing unit 106 may be configured to render the second graphical content for the second group of one or more bins using spatial anti-aliasing of a second sample level or not using spatial anti-aliasing. In some examples, the first sample level is higher than the second sample level.

In some examples, before rendering graphical content, the second processing unit 106 may be configured to generate respective visibility information for each respective bin of the plurality of bins. In such examples, to render the first graphical content for the first group of one or more bins, the second processing unit 106 may be configured to render the first graphical content for the first group of one or more bins on a per bin basis based on the respective visibility information for each respective bin of the first group of bins. In some examples, to render the second graphical content for the second group of one or more bins, the second processing unit 106 may be configured to render the second graphical content for the second group of one or more bins on a per bin basis based on the respective visibility information for each respective bin of the second group of bins. In other examples, to render the second graphical content for the second group of one or more bins, the second processing unit 106 may be configured to combine the respective visibility information from each respective bin of the second group of bins, and render the second graphical content for the second group of one or more bins in a single rendering pass based on the combined visibility information.

The second processing unit 106 may be configured to store, after the first graphical content is rendered, the rendered first graphical content for the first group of one or more bins into the second memory.

Figure 4:
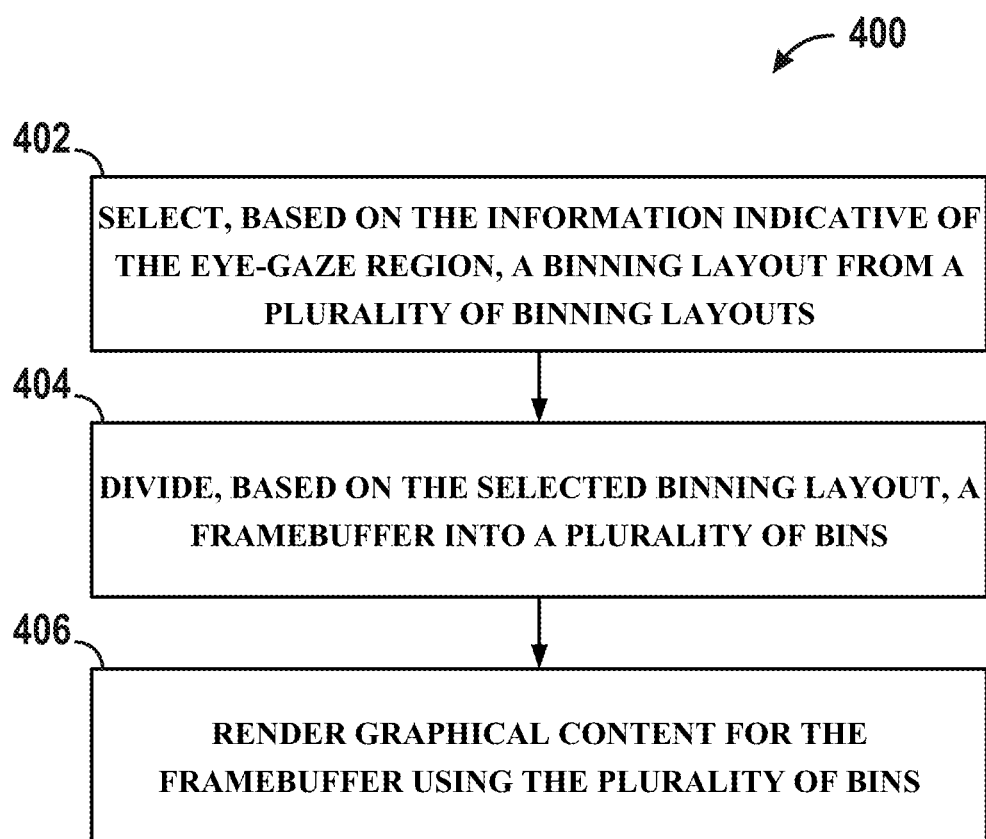
FIG. 4 illustrates an example flowchart of an example method in accordance with one or more techniques of this disclosure.

FIG. 4 illustrates an example flowchart 400 of a method in accordance with one or more techniques of this disclosure. The method may be performed by the second processing unit 106. In some examples, the method illustrated in flowchart 400 may include one or more functions described herein that are not illustrated in FIG. 4, and/or may exclude one or more illustrated functions.

At block 402, the second processing unit 106 may be configured to select, based on the information indicative of the eye gaze region, a bin layout from a plurality of bin layouts. At block 404, the second processing unit 106 may be configured to divide, based on the selected bin layout, a framebuffer into a plurality of bins. At block 406, the second processing unit 106 may be configured to render graphical content for the framebuffer using the plurality of bins.

In some examples, to select the bin layout from the plurality of bin layouts, the second processing unit 106 may be configured to select, from the plurality of bin layouts, a first bin layout that includes the least number of bins that overlap with the eye gaze region relative to the plurality of bin layouts. The first bin layout in this example, is the selected bin layout. In some examples, to select the first bin layout that includes the least number of bins that overlap with the eye gaze region relative to the plurality of bin layouts, the second processing unit 106 may be configured to determine a respective number of bins that overlap with the eye gaze region for each respective bin layout of the plurality of bin layouts, and determine that the respective number of bins that overlap with the eye gaze region for the first bin layout is less than the respective number of bins that overlap with the eye gaze region for each other respective bin layout of the plurality of bin layouts.

In some examples, the second processing unit 106 may be configured to generate respective visibility information for each respective bin of the plurality of bins. In some examples, to render graphical content for the framebuffer using the plurality of bins, the second processing unit 106 may be configured to render the graphical content based on the respective visibility information for each respective bin of the plurality of bins.

In some examples, the second processing unit 106 may be configured to determine, based on the information indicative of the eye gaze region, that first graphical content for a first group of one or more bins of the plurality of bins is to be rendered using a tile-based rendering mode, and/or determine based on the information indicative of the eye gaze region, that second graphical content for a second group of one or more bins of the plurality of bins is to be rendered using a direct rendering mode. In such examples, the graphical content includes the first graphical content and the second graphical content. For example, the first graphical content and the second graphical content correspond to the same frame being rendered.

Figure 5:
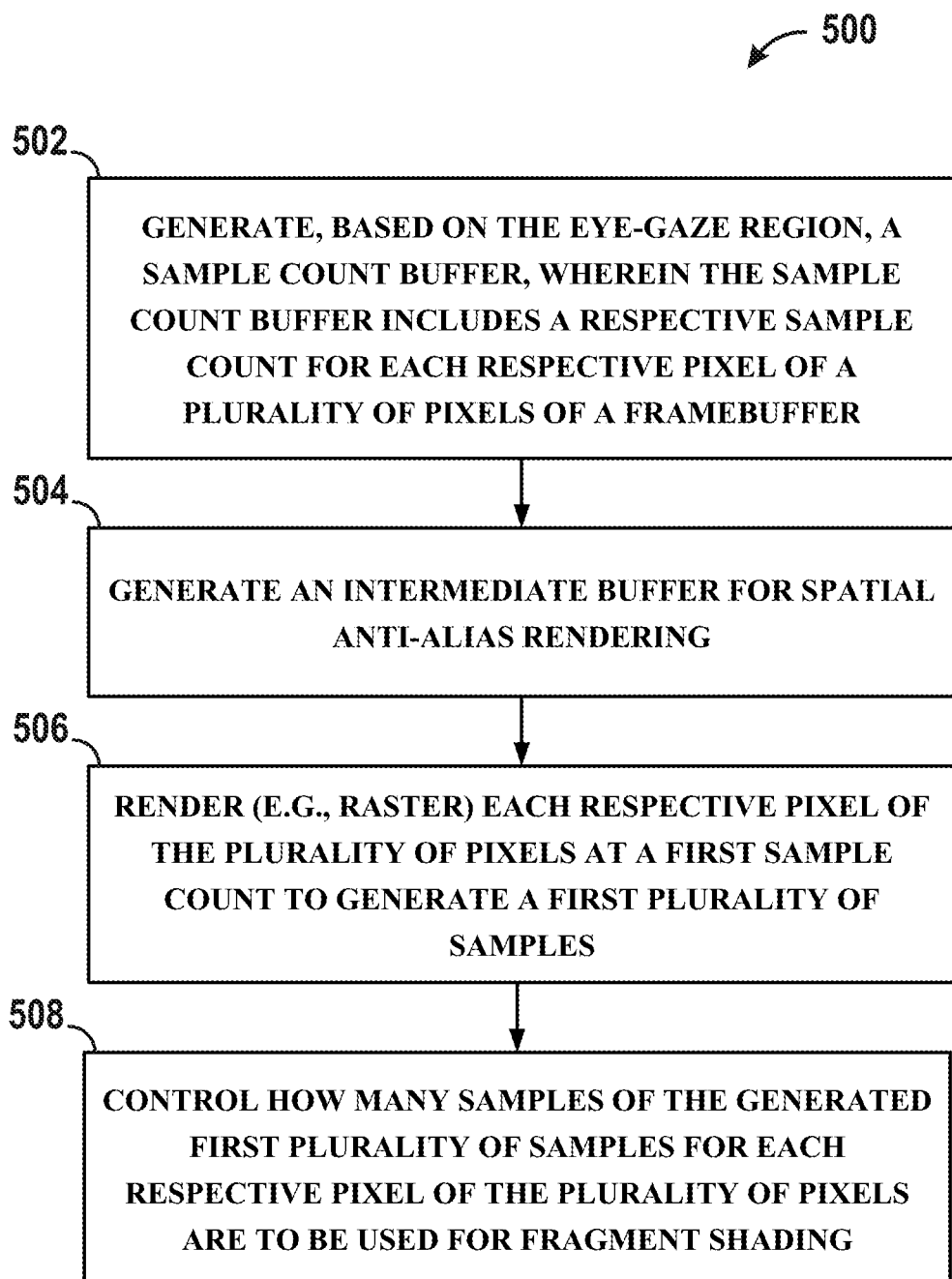
FIG. 5 illustrates an example flowchart of an example method in accordance with one or more techniques of this disclosure.

FIG. 5 illustrates an example flowchart 500 of a method in accordance with one or more techniques of this disclosure. The method may be performed by the second processing unit 106. In some examples, the method illustrated in flowchart 500 may include one or more functions described herein that are not illustrated in FIG. 5, and/or may exclude one or more illustrated functions.

At block 502, the second processing unit 106 may be configured to generate, based on the eye gaze region, a sample count buffer. The sample count buffer may include a respective sample count for each respective pixel of a plurality of pixels of a framebuffer. The respective sample count for each respective pixel may indicate a respective number of samples required to fragment shade the respective pixel. The respective sample count for a first pixel may be greater than the respective sample count for a second pixel. The first pixel may correspond to the eye gaze region and the second pixel may not correspond to the eye gaze region.

At block 504, the second processing unit 106 may be configured to generate an intermediate buffer for spatial anti-alias rendering. The intermediate buffer may be configured to store a first plurality of samples at a first sample count per pixel. The framebuffer may be configured to store a second plurality of samples at a second sample count per pixel. The first plurality of samples may be greater than the second plurality of samples. The first sample count per pixel may be higher than the second sample count per pixel. The first sample count per pixel is two or more samples per pixel. The second sample count per pixel is one sample per pixel. The intermediate buffer may be a first size with first dimensions. The framebuffer and the sample count buffer may be a second size with second dimensions. The first size may be larger than the second size.

At block 506, the second processing unit 106 may be configured to render (e.g., raster) each respective pixel of the plurality of pixels at the first sample count to generate the first plurality of samples. The first plurality of samples may be rendered (e.g., rasterized) into the intermediate buffer In some examples, to render (e.g., raster) each respective pixel of the plurality of pixels at the first sample count to generate the first plurality of samples, the second processing unit 106 may be configured to render a first pixel and second pixel of the plurality of pixels at the first sample count. In such examples, the respective sample count in the sample count buffer for the first pixel is greater than the respective sample count in the sample count buffer for the second pixel is indicative that the first pixel corresponds to the eye gaze region and the second pixel does not correspond to the eye gaze region.

At block 508, the second processing unit 106 may be configured to control, based on the respective sample count in the sample count buffer for each respective pixel, how many samples of the generated first plurality of samples for each respective pixel of the plurality of pixels are to be used for fragment shading. Fragment shading may, in some examples, constitute the final rendering for each pixel. In some examples, to control how many samples of the generated first plurality of samples for each respective pixel of the plurality of pixels are to be used for fragment shading, the second processing unit 106 may be configured to (1) allow, based on the respective sample count in the sample count buffer for the first pixel, all samples generated for the first pixel to be used for fragment shading the first pixel; and (2) allow, based on the respective sample count in the sample count buffer for the second pixel, less than all samples generated for the second pixel to be used for fragment shading the second pixel.

In some examples, the second processing unit 106 may be configured to compress the sample count buffer. In such examples, to compress the sample count buffer, the second processing unit may be configured to divide the sample count buffer into a plurality of blocks. Each respective block of the plurality of blocks may include two or more respective sample counts. Each respective block of the plurality of blocks has a size of N×M sample counts, wherein N represents a number of respective sample counts of the two or more respective sample counts along a first axis and M represents a number of respective sample counts of the two or more respective sample counts along a second axis. In some examples, N is equal to M. In other examples, N is unequal to M. For example, N may be greater than M, or N may be less than M.

In some examples, to compress the sample count buffer, the second processing unit 106 may be configured to determine, for each respective block of the plurality of blocks, a highest sample count among the two or more respective sample counts in the respective block. The second processing unit 106 may be configured to store, for each respective block of the plurality of blocks, a single respective sample count for each respective block of the plurality of blocks into a compressed sample count buffer. The single respective sample count for each respective block may be the determined highest sample count and represents the sample count for each respective pixel corresponding to the respective block.

In accordance with this disclosure, the term "or" may be interrupted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, it is understood that such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules or units are described in this disclosure to emphasize functional aspects of devices configured to perform the disclosed techniques, but do not necessarily require realization by different hardware units. Rather, as described above, various units may be combined in any hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   receiving, by a processing unit, information indicative of an eye gaze region;
   generating, by the processing unit based on the eye gaze region, a sample count buffer, wherein the sample count buffer includes a respective sample count for each respective pixel of a plurality of pixels of a framebuffer, wherein the respective sample count for each respective pixel indicates a respective number of samples required to fragment shade the respective pixel;
   generating, by the processing unit, an intermediate buffer for spatial anti-alias rendering, wherein the intermediate buffer is configured to store a first plurality of samples at a first sample count per pixel and the framebuffer is configured to store a second plurality of samples at a second sample count per pixel, wherein the first plurality of samples is greater than the second plurality of samples, wherein the first sample count per pixel is higher than the second sample count per pixel;
   rendering, by the processing unit into the intermediate buffer, each respective pixel of the plurality of pixels at the first sample count to generate the first plurality of samples; and
   controlling, by the processing unit based on the respective sample count in the sample count buffer for each respective pixel, how many samples of the generated first plurality of samples for each respective pixel of the plurality of pixels are to be used for fragment shading.

2. The method of claim 1, wherein the first sample count per pixel is two or more samples per pixel, and wherein the second sample count per pixel is one sample per pixel.

3. The method of claim 1, wherein the intermediate buffer is a first size with first dimensions, wherein the framebuffer and the sample count buffer are a second size with second dimensions, and wherein the first size is larger than the second size.

4. The method of claim 1, wherein the respective sample count for a first pixel is greater than the respective sample count for a second pixel.

5. The method of claim 4, wherein the first pixel corresponds to the eye gaze region and the second pixel does not correspond to the eye gaze region.

6. The method of claim 1, wherein rendering each respective pixel of the plurality of pixels at the first sample count to generate the first plurality of samples comprises:
   rendering a first pixel and second pixel of the plurality of pixels at the first sample count, wherein the respective sample count in the sample count buffer for the first pixel is greater than the respective sample count in the sample count buffer for the second pixel is indicative that the first pixel corresponds to the eye gaze region and the second pixel does not correspond to the eye gaze region.

7. The method of claim 6, wherein controlling how many samples of the generated first plurality of samples for each respective pixel of the plurality of pixels are to be used for fragment shading comprises:
   allowing, based on the respective sample count in the sample count buffer for the first pixel, all samples generated for the first pixel to be used for fragment shading the first pixel; and
   allowing, based on the respective sample count in the sample count buffer for the second pixel, less than all samples generated for the second pixel to be used for fragment shading the second pixel.

8. The method of claim 1, further comprising:
   compressing the sample count buffer.

9. The method of claim 8, wherein compressing the sample count buffer comprises:
   dividing the sample count buffer into a plurality of blocks, wherein each respective block of the plurality of blocks includes two or more respective sample counts.

10. The method of claim 9, wherein each respective block of the plurality of blocks has a size of N×M sample counts, wherein N represents a number of respective sample counts of the two or more respective sample counts along a first axis and M represents a number of respective sample counts of the two or more respective sample counts along a second axis.

11. The method of claim 10, wherein N is equal to M.

12. The method of claim 10, wherein N is unequal to M.

13. The method of claim 12, wherein N is greater than M.

14. The method of claim 12, wherein N is less than M.

15. The method of claim 9, wherein compressing the sample count buffer further comprises:
   determining, for each respective block of the plurality of blocks, a highest sample count among the two or more respective sample counts in the respective block;
   storing, for each respective block of the plurality of blocks, a single respective sample count for each respective block of the plurality of blocks into a compressed sample count buffer, wherein the single respective sample count for each respective block is the determined highest sample count and represents the sample count for each respective pixel corresponding to the respective block.

16. A processing unit configured to:
   receive information indicative of an eye gaze region;
   generate, based on the eye gaze region, a sample count buffer, wherein the sample count buffer includes a respective sample count for each respective pixel of a plurality of pixels of a framebuffer, wherein the respective sample count for each respective pixel indicates a respective number of samples required to fragment shade the respective pixel;
   generate an intermediate buffer for spatial anti-alias rendering, wherein the intermediate buffer is configured to store a first plurality of samples at a first sample count per pixel and the framebuffer is configured to store a second plurality of samples at a second sample count per pixel, wherein the first plurality of samples is greater than the second plurality of samples, wherein the first sample count per pixel is higher than the second sample count per pixel;
   render, into the intermediate buffer, each respective pixel of the plurality of pixels at the first sample count to generate the first plurality of samples; and
   control, based on the respective sample count in the sample count buffer for each respective pixel, how many samples of the generated first plurality of samples for each respective pixel of the plurality of pixels are to be used for fragment shading.

17. The processing unit of claim 16, wherein the first sample count per pixel is two or more samples per pixel, and wherein the second sample count per pixel is one sample per pixel.

18. The processing unit of claim 16, wherein the intermediate buffer is a first size with first dimensions, wherein the framebuffer and the sample count buffer are a second size with second dimensions, and wherein the first size is larger than the second size.

19. The processing unit of claim 16, wherein the respective sample count for a first pixel is greater than the respective sample count for a second pixel.

20. The processing unit of claim 19, wherein the first pixel corresponds to the eye gaze region and the second pixel does not correspond to the eye gaze region.

21. The processing unit of claim 16, wherein to render each respective pixel of the plurality of pixels at the first sample count to generate the first plurality of samples, the processing unit is configured to:
render a first pixel and second pixel of the plurality of pixels at the first sample count, wherein the respective sample count in the sample count buffer for the first pixel is greater than the respective sample count in the sample count buffer for the second pixel is indicative that the first pixel corresponds to the eye gaze region and the second pixel does not correspond to the eye gaze region.

22. The processing unit of claim 21, wherein to control how many samples of the generated first plurality of samples for each respective pixel of the plurality of pixels are to be used for fragment shading, the processing unit is configured to:
allow, based on the respective sample count in the sample count buffer for the first pixel, all samples generated for the first pixel to be used for fragment shading the first pixel; and
allow, based on the respective sample count in the sample count buffer for the second pixel, less than all samples generated for the second pixel to be used for fragment shading the second pixel.

23. The processing unit of claim 16, further configured to: compress the sample count buffer.

24. The processing unit of claim 23, wherein to compress the sample count buffer, the processing unit is configured to:
divide the sample count buffer into a plurality of blocks, wherein each respective block of the plurality of blocks includes two or more respective sample counts.

25. The processing unit of claim 24, wherein each respective block of the plurality of blocks has a size of N×M sample counts, wherein N represents a number of respective sample counts of the two or more respective sample counts along a first axis and M represents a number of respective sample counts of the two or more respective sample counts along a second axis.

26. The processing unit of claim 25, wherein N is equal to M.

27. The processing unit of claim 25, wherein N is unequal to M.

28. The processing unit of claim 27, wherein N is greater than M.

29. The processing unit of claim 27, wherein N is less than M.

30. The processing unit of claim 24, wherein to compress the sample count buffer, the processing unit is configured to:
determine, for each respective block of the plurality of blocks, a highest sample count among the two or more respective sample counts in the respective block;
store, for each respective block of the plurality of blocks, a single respective sample count for each respective block of the plurality of blocks into a compressed sample count buffer, wherein the single respective sample count for each respective block is the determined highest sample count and represents the sample count for each respective pixel corresponding to the respective block.

* * * * *